US011840355B2

(12) United States Patent
Ando et al.

(10) Patent No.: US 11,840,355 B2
(45) Date of Patent: Dec. 12, 2023

(54) AIRCRAFT HOVERING WORK SUPPORT SYSTEM AND AIRCRAFT INCLUDING SAME

(71) Applicant: Kawasaki Jukogyo Kabushiki Kaisha, Kobe (JP)

(72) Inventors: Shinichiro Ando, Konan (JP); Naomasa Shinoda, Gifu (JP); Junichi Sakamoto, Kakamigahara (JP); Hiroki Tsukida, Kakamigahara (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/741,441

(22) Filed: May 11, 2022

(65) Prior Publication Data

US 2022/0267022 A1 Aug. 25, 2022

Related U.S. Application Data

(60) Division of application No. 16/713,034, filed on Dec. 13, 2019, now Pat. No. 11,377,226, which is a
(Continued)

(30) Foreign Application Priority Data

Jun. 13, 2017 (JP) .................. 2017-116150

(51) Int. Cl.
B64D 43/00 (2006.01)
B64C 27/00 (2006.01)
(Continued)

(52) U.S. Cl.
CPC .............. *B64D 43/00* (2013.01); *B64C 27/00* (2013.01); *B64D 47/08* (2013.01); *H04N 5/272* (2013.01); *H04N 5/445* (2013.01); *H04N 23/90* (2023.01)

(58) Field of Classification Search
CPC ........ B64D 43/00; B64D 47/08; H04N 23/90; H04N 5/272; H04N 5/445; B64C 27/00
(Continued)

(56) References Cited

U.S. PATENT DOCUMENTS 5,371,581 A 12/1994 Wangler et al.
6,101,431 A 8/2000 Niwa et al.
(Continued)

FOREIGN PATENT DOCUMENTS

EP 1602942 A1 12/2005
JP 11-72350 A 3/1999
(Continued)

*Primary Examiner* — John W Miller
*Assistant Examiner* — Omer Khalid
(74) *Attorney, Agent, or Firm* — XSENSUS LLP

(57) ABSTRACT

A support system for use with an aircraft or vehicle capable of hovering. The support system includes a detecting portion provided outside an airframe and configured to detect a target object that may become an obstacle; an imaging portion configured to take an image of surroundings of the aircraft; a data processing portion; a display portion and the like. The data processing portion acquires data from the detecting portion and an avionics system. The data processing portion uses the acquired data to generate target object schematic image data indicating approach of the target object or possibility of the approach of the target object and outputs the target object schematic image data to the display portion. The display portion displays an obstacle state display image based on the target object schematic image data, the obstacle state display image schematically showing a state of the obstacle around the aircraft.

7 Claims, 12 Drawing Sheets

Related U.S. Application Data continuation of application No. PCT/JP2018/022379, filed on Jun. 12, 2018.

(51) Int. Cl.
  *B64D 47/08* (2006.01)
  *H04N 5/445* (2011.01)
  *H04N 5/272* (2006.01)
  *H04N 23/90* (2023.01)

(58) Field of Classification Search
  USPC .......................................................... 348/144
  See application file for complete search history.

(56) References Cited

U.S. PATENT DOCUMENTS

| | | | |
|---|---|---|---|
| 9,557,415 B2 | 1/2017 | Karam et al. | |
| 9,557,416 B2 | 1/2017 | Samuthirapandian et al. | |
| 10,000,297 B2 * | 6/2018 | He | G06T 3/60 |
| 11,254,313 B2 | 2/2022 | Ito et al. | |
| 2003/0043363 A1 | 3/2003 | Jamieson et al. | |
| 2012/0029738 A1 | 2/2012 | Brunetti et al. | |
| 2013/0120164 A1 | 5/2013 | Greene et al. | |
| 2013/0321176 A1 | 12/2013 | Vasek et al. | |
| 2015/0211883 A1 | 7/2015 | He | |
| 2015/0251667 A1 | 9/2015 | Lu et al. | |
| 2016/0167580 A1 | 6/2016 | Hanita et al. | |
| 2017/0025024 A1 | 1/2017 | Kabrt et al. | |
| 2018/0075762 A1 * | 3/2018 | Gadgil | G08G 5/04 |
| 2019/0291731 A1 | 9/2019 | Takaki | |
| 2021/0216787 A1 | 7/2021 | Van Hoof et al. | |

FOREIGN PATENT DOCUMENTS

| | | |
|---|---|---|
| JP | 2008-134257 A | 6/2008 |
| JP | 2011-246111 A | 12/2011 |
| JP | 2013-249057 A | 12/2013 |
| JP | 2015-114257 A | 6/2015 |
| JP | 6008469 B2 | 10/2016 |

* cited by examiner

AIRCRAFT HOVERING WORK SUPPORT SYSTEM AND AIRCRAFT INCLUDING SAME

CROSS-REFERENCE TO RELATED APPLICATIONS

The present application is a divisional of U.S. application Ser. No. 16/713,034, filed Dec. 13, 2019, which is a bypass continuation of PCT filing PCT/JP2018/022379, filed Jun. 12, 2018, which claims priority to JP 2017-116150, filed Jun. 13, 2017, the entire contents of each are incorporated herein by reference.

TECHNICAL FIELD

The present invention relates to a hovering work support system configured to support a pilot during hovering work of a vehicle such as an aircraft or helicopter, capable of hovering, and an aircraft or vehicle including the hovering work support system.

BACKGROUND ART

An aircraft, such as a helicopter, capable of hovering hovers not only at the time of takeoff and landing but also at the time of rescue work, relief work, and the like. However, since the hovering is restricted by various conditions, stabilizing an airframe of the aircraft by the hovering is generally regarded as difficult, and it is known that the decrease in the stability of the airframe leads to accidents. Therefore, for example, as a measure to avoid the accidents, it is known that in addition to visual monitoring by the pilot, an in-flight assistant (watchman) who monitors an outside of the aircraft to secure the stability during the hovering may be utilized. According to this measure, the pilot and the watchman communicate with each other by using a talking apparatus, or the like.

Further, to deal with the boarding of the watchman, a technique of supporting the piloting of the aircraft, such as the helicopter, is also known. For example, PTL 1 discloses an aircraft, an aircraft piloting support method, and an interface, each of which intends to prevent an aircraft capable of hovering from colliding with an obstacle due to a misjudgment of an operator who is in charge of visual monitoring of the obstacle, a communication failure between the operator and the pilot, or the like.

The aircraft disclosed in PTL 1 includes: at least one sensor configured to acquire a distance value between the aircraft and the obstacle; and a control unit. The sensor is arranged at a position surrounding a drive shaft of a rotary wing of the aircraft. The sensor includes a planar sweeping region. When an obstacle exists in the planar sweeping region, the sensor acquires a distance value between a point on the obstacle and a point on the aircraft. When the control unit determines based on the distance value acquired by the sensor that the point on the obstacle is located within a close region of the aircraft, the control unit outputs a warning signal.

The interface disclosed in PTL 1 can display, for example, a contour line indicating an intersection between an outer surface of the obstacle and the planar sweeping region of the sensor, a point indicating the position of the aircraft relative to the contour line, a circular image indicating a disc-shaped contour line of the rotary wing, an entire size image of the aircraft, and a vector indicating a recommended back-off direction in which the helicopter is returned from the obstacle.

CITATION LIST

Patent Literature

PTL 1: Japanese Laid-Open Patent Application Publication No. 2011-246111

SUMMARY OF INVENTION

Technical Problem

The aircraft, the aircraft piloting support method, and the interface in PTL 1 are disclosed on the basis that the watchman (operator) gets on the aircraft. According to a helicopter for rescue or relief, it is desired that as many rescue or medical staff get on the helicopter as possible, and as many relief goods and the like as possible be loaded. Therefore, letting the watchman who is in charge of only the monitoring of the outside of the helicopter get on the helicopter leads to the decrease in the number of rescue staff and the like in the helicopter and the decrease in the number of relief goods and the like in the helicopter.

SUMMARY

An aircraft hovering work support system according to the present invention is mounted on an aircraft capable of hovering and includes: a detecting portion configured to detect a target object which is located outside an airframe of the aircraft and may become an obstacle during hovering of the aircraft; a data processing portion configured to process data acquired from at least one of the detecting portion and an avionics system of the aircraft; and a display portion. The data processing portion generates target object schematic image data by using detected data acquired from the detecting portion and avionics data acquired from the avionics system and outputs the target object schematic image data to the display portion, the target object schematic image data indicating approach of the target object to the aircraft or possibility of the approach of the target object to the aircraft. Based on the target object schematic image data, the display portion displays an obstacle state display image schematically showing a state of the obstacle around the aircraft.

According to the above configuration, the data processing portion generates the target object schematic image data by using the data acquired from the detecting portion and the avionics system, and the display portion displays, based on the target object schematic image data, the obstacle state display image containing a schematic image of the target object that may become an obstacle. Since the target object schematic image data is generated by using not only the detected data acquired from the detecting portion but also the avionics data of the aircraft, the target object schematic image data is the image data having more excellent accuracy. With this, the pilot can easily recognize the presence or absence of the obstacle around the aircraft or the state of the approach of the obstacle only by temporarily confirming the display portion during the hovering. Therefore, the pilot can properly recognize the existence of the obstacle during the hovering work of the aircraft capable of hovering.

Further, an aircraft hovering work support system according to the present invention is mounted on an aircraft capable of hovering and includes: a detecting portion configured to detect a target object which is located outside an airframe of the aircraft and may become an obstacle during hovering of the aircraft; a data processing portion configured to process data acquired from at least one of the detecting portion and an avionics system of the aircraft; and a display portion. The data processing portion generates state image data and plural-stage target object schematic image data from the acquired data and outputs the state image data and the plural-stage target object schematic image data to the display portion, the state image data indicating a state of surroundings of the airframe as a center, the plural-stage target object schematic image data indicating approach of the target object to the aircraft or possibility of the approach of the target object to the aircraft and corresponding to a distance to the target object. As an obstacle state display image showing a state of the obstacle around the aircraft, the display portion displays a circular image and a target object schematic image, the circular image being based on the state image data and corresponding to front, rear, left, and right directions of the airframe as a center, the target object schematic image being based on the target object schematic image data and located at a circumference portion of the circular image in a direction corresponding to a direction in which the target object exists. When the target object approaches the airframe, the target object schematic image is displayed so as to project from the circumference portion of the circular image toward a center portion of the circular image in accordance with stages of the target object schematic image data.

According to the above configuration, the data processing portion generates the state image data and the target object schematic image data from the data acquired from the detecting portion and the avionics system, and the display portion displays, based on the state image data and the target object schematic image data, the circular image and the plural-stage target object schematic image which show the state around the aircraft. Especially, the target object schematic image is displayed so as to project toward the airframe from a direction corresponding to a direction of the existence of the target object as the target object approaches. With this, the pilot can easily recognize the presence or absence of the obstacle around the aircraft or the state of the approach of the obstacle only by temporarily confirming the display portion during the hovering. Therefore, the pilot can properly recognize the existence of the obstacle during the hovering work of the aircraft capable of hovering.

The aircraft capable of hovering according to the present invention includes any one of the above aircraft hovering work support systems.

DESCRIPTION OF EMBODIMENTS

Hereinafter, a typical embodiment of the present disclosure will be described with reference to the drawings. In the following description and the drawings, the same reference signs are used for the same or corresponding components, and a repetition of the same explanation is avoided.

Configuration of Aircraft Hovering Work Support System

Figure 1:
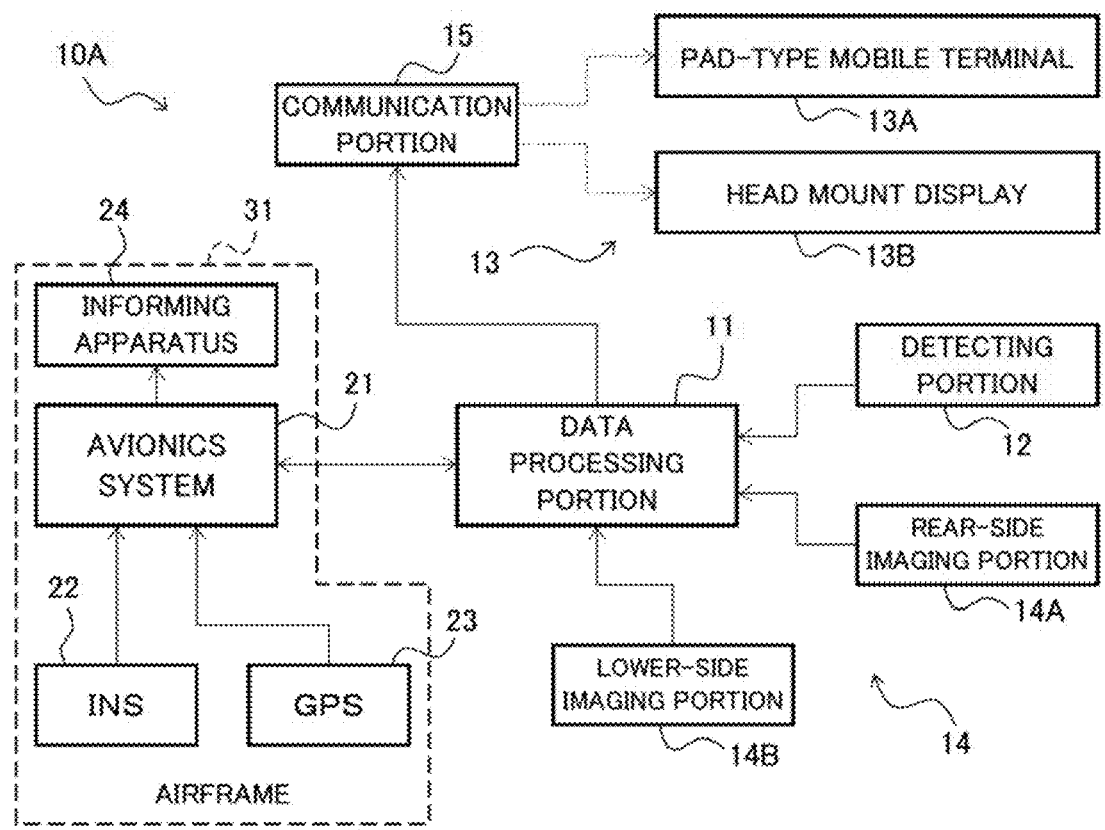
FIG. 1 is a schematic block diagram showing a configuration example of an aircraft hovering work support system according to an embodiment of the present invention.
Figure 2:
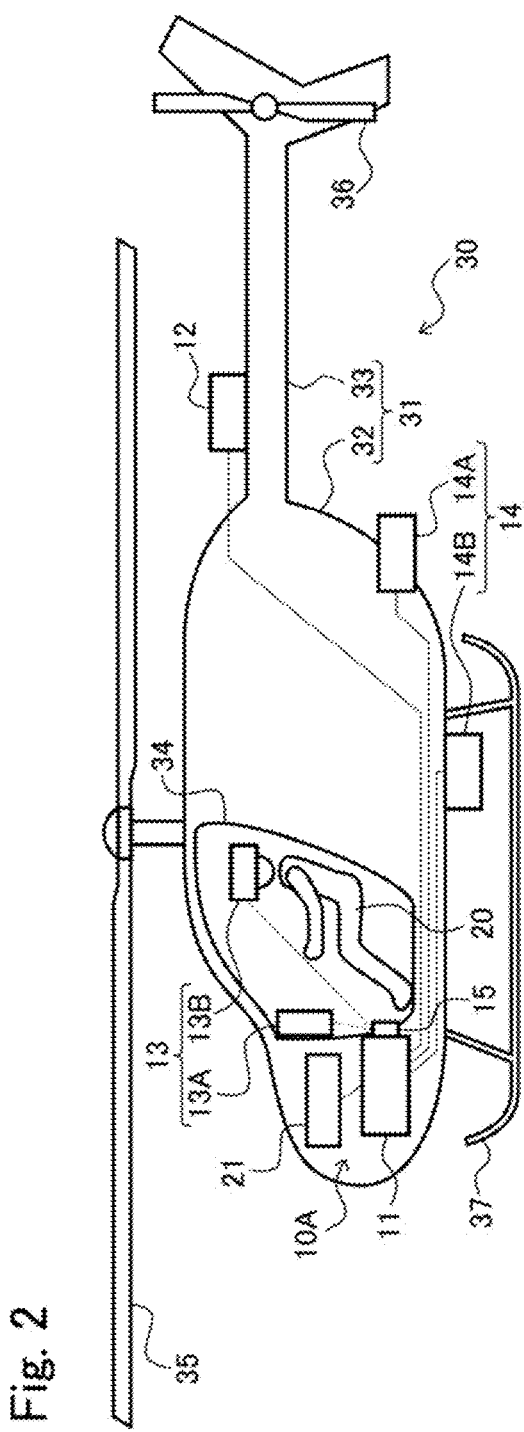
FIG. 2 is a schematic diagram showing a schematic configuration of a helicopter to which the aircraft hovering work support system shown in FIG. 1 is applied.

One example of the configuration of an aircraft hovering work support system according to the present disclosure will be specifically described with reference to FIGS. 1 and 2. As shown in FIG. 1, an aircraft hovering work support system 10A according to the present embodiment includes a data processing portion 11, a detecting portion 12, a display portion 13, imaging portions 14A and 14B, and a communication portion 15. As shown in FIG. 2, the aircraft hovering work support system 10A is mounted on a helicopter 30 that is an aircraft capable of hovering. In the following description, for convenience sake, the "aircraft hovering work support system" is simply referred to as a "support system."

The data processing portion 11 is connected to an avionics system 21 mounted on an airframe 31 of the helicopter 30. Data input and output can be bidirectionally performed between the data processing portion 11 and the avionics system 21. This means that the support system 10A is connected to the helicopter 30. The avionics system 21 is a system including a plurality of avionics apparatuses provided at the airframe 31. The avionics system 21 is only required to be a known system provided at the airframe 31 depending on the type of the helicopter 30 (or the aircraft capable of hovering).

In FIGS. 1 and 2, for convenience of explanation, the avionics system 21 is shown by a single block. As shown in FIG. 1, the avionics system 21 includes functions and capabilities related to navigation systems, such as an inertial navigation system (INS) 22 and a global positioning system (GPS) 23 and may include an informing apparatus 24 such as a display and/or speaker. The informing apparatus 24 may be considered a user interface, as the informing apparatus 24 provides a user with information. It is not necessary, although it is possible, for the informing apparatus 24 to receive input from a user. In FIG. 1, for convenience of explanation, the INS 22, the GPS 23, and the informing apparatus 24 are shown by respective blocks separately from the avionics system 21.

The data processing portion 11 processes data acquired from at least one of the detecting portion 12, the display portion 13, the imaging portions 14, and the avionics system 21. For convenience of explanation, data obtained by processing the data (acquired data) acquired by the data processing portion 11 is referred to as "processed data." As described below, the data processing portion 11 generates, as the processed data, various image data used for a display operation of the display portion 13 and outputs the image data to the display portion 13.

Especially in the present disclosure, the data processing portion 11 generates the image data as the processed data by using not only detected data acquired from the detecting portion 12 but also avionics data acquired from the avionics system 21. Needless to say, the data processing portion 11 may generate the processed data other than the image data. One example of the processed data other than the image data is the below-described warning data. The data processing portion 11 outputs the generated warning data to the informing apparatus 24 included in the helicopter 30. The specific configuration of the data processing portion 11 is not especially limited, and examples of the data processing portion 11 include known calculating devices, such as a microcomputer, a microcontroller, a processor, CPU (central processing unit), processing circuitry, or circuitry.

The detecting portion 12 is provided outside the airframe 31 of the helicopter 30. The detecting portion 12 detects a target object that may become an obstacle during the hovering of the helicopter 30. Then, the detecting portion 12 generates the detected data and outputs the detected data to the data processing portion 11. The specific configuration of the detecting portion 12 is not especially limited. The detecting portion 12 is only required to be a known sensor capable of detecting the target object. It is preferable that the detected data contain distance data indicating a distance to the target object. It is more preferable that the detected data contain the distance data and position data indicating a position of the target object.

A typical example of the detecting portion 12 capable of detecting the distance data and the position data is a detecting portion configured to irradiate the target object with an electromagnetic wave and receive its reflected wave. Specifically, examples of the detecting portion 12 include a known radar and a LIDAR (Light Detection and Ranging). Especially, the LIDAR is preferably used. The LIDAR irradiates the target object with, as pulsed laser, light (visible light, ultraviolet, infrared light, or the like) that is an electromagnetic wave having a shorter wavelength than a radar, and receives its reflected wave. The LIDAR acquires the direction and distance of the received reflected wave as three-dimensional information. Therefore, the LIDAR can obtain the characteristics of the target object with higher resolution than the radar. Other implementations of the detecting part include sound based detectors such as a sonar, and radio wave detectors such as radar.

In the example shown in FIG. 2, the detecting portion 12 is provided on an upper surface of a tail portion 33 located outside the airframe 31. However, the installation position of the detecting portion 12 is not especially limited as long as it detects outside the airframe 31 and is a position where the detecting portion 12 can detect the target object that may become an obstacle during the hovering. Typically, it is preferable that the installation position of the detecting portion 12 be a position where the detecting portion 12 can detect an obstacle around the airframe 31. It is more preferable that the installation position of the detecting portion 12 be a position where the detecting portion 12 can detect an obstacle located in a direction corresponding to a blind spot of a pilot 20, or the installation position of the detecting portion 12 be a position where the detecting portion 12 can detect an obstacle around a main rotor 35.

The display portion 13 is only required to display an image based on the image data output from the data processing portion 11. The specific configuration of the display portion 13 is not especially limited. In the present embodiment, as shown in FIGS. 1 and 2, a pad-type mobile terminal (mobile terminal) or display 13A and a head mount display (HMD) 13B are used as the display portion 13. It should be noted that when a piloting display system is provided at a pilot seat 34 of the helicopter 30, such piloting display system can be used as the display portion 13 of the support system 10A. In this case, the image data is only required to be output from the data processing portion 11 through the avionics system 21.

The imaging portions 14 are provided outside the airframe 31 of the helicopter 30. Each of the imaging portions 14 takes an image of part of surroundings of the helicopter 30 and outputs the image as taken-image data (video image data). The specific configurations of the imaging portions 14 are not especially limited. Known video cameras can be suitably used as the imaging portions 14. In the present embodiment, as shown in FIGS. 1 and 2, a rear-side imaging portion 14A and a lower-side imaging portion 14B are included as the imaging portions 14. The rear-side imaging portion 14A takes an image of a rear direction (rear side) of the helicopter 30, and the lower-side imaging portion 14B takes an image of a lower direction (lower side) of the helicopter 30. Each of the rear direction and the lower direction is a direction which may correspond to the blind spot of the pilot 20 seated on the pilot seat 34.

Since a front direction of the airframe 31 is within the field of view of the pilot 20, the pilot 20 can visually confirm the approach of the target object that may become an obstacle. However, since the rear direction of the airframe 31 corresponds to the blind spot, the pilot 20 cannot visually confirm the approach of the target object. As shown in FIG. 2, a rear portion of the airframe 31 of the helicopter 30 extends in the rear direction as the tail portion 33, and a tail rotor 36 is provided at a rearmost end of the tail portion 33. Therefore, for example, in order to confirm the approach of the target object to the main rotor 35 or the tail rotor 36 (or the tail portion 33) at the rear side of the airframe 31, it is preferable to provide the rear-side imaging portion 14A.

In the example shown in FIG. 2, the helicopter 30 includes a skid 37 as a landing gear. Since the skid 37 is provided on a lower surface of the airframe 31, the skid 37 may be caught by an overhead contact line, a tree, or the like during the hovering work. Further, during the hovering work of the helicopter 30, a rescue staff may come down, or a person to be rescued may be pulled up with a rescue winch (hoist). Therefore, in order to allow the pilot 20 to confirm the lower direction of the airframe 31 during the hovering, it is preferable to provide the lower-side imaging portion 14B.

In the example shown in FIG. 2, the rear-side imaging portion 14A is provided at a lower portion of a rear surface of a body portion 32 located outside the airframe 31, and the lower-side imaging portion 14B is provided on a lower surface of the body portion 32. However, the installation positions of the imaging portions 14 are not limited to this. Each of the installation positions of the imaging portions 14 is only required to be a position where the imaging portion 14 can take an image of a direction corresponding to the blind spot of the pilot 20, a direction which does not correspond to the blind spot but is difficult for the pilot 20 to visually confirm during the hovering, or the like. Further, in the present embodiment, the rear-side imaging portion 14A and the lower-side imaging portion 14B are only required to be general optical video cameras. However, a special imaging apparatus, such as an infrared video camera, may be used depending on the type of the hovering work of the helicopter 30.

As described above, in the present embodiment, the mobile terminal 13A and the HMD 13B are used as the display portion 13 and are independent apparatuses which are not fixedly mounted on the helicopter 30. Therefore, in the present embodiment, the support system 10A includes the communication portion 15, which is implemented as communication circuitry, and is configured to transmit the image data, output from the data processing portion 11, to the mobile terminal 13A or the HMD 13B through wireless communication. The specific configuration of the communication portion 15 is not especially limited. A known wireless LAN, such as Wi-Fi (trademark), Bluetooth (trademark), or wireless Ethernet (trademark), can be used as the communication portion 15. Further, the data processing portion 11 and the display portion 13 may be connected to each other through a wired connection instead of wireless connection.

In the support system 10A, the data processing portion 11 acquires the detected data from the detecting portion 12 and the taken-image data from the imaging portion(s) 14, generates the image data, and outputs the image data to the display portion 13 through the communication portion 15. As shown in FIGS. 1 and 2, the data processing portion 11 is connected to the airframe 31 of the helicopter 30 through the avionics system 21 and the like. Therefore, the data processing portion 11 can output the generated image data (or the other processed data) to the helicopter 30. In addition, the data processing portion 11 can acquire the data from the helicopter 30 and use the data for the generation of the image data and the like.

For example, the informing apparatus 24, such as a warning light, a sound alarm device, or a piloting display system displaying various messages, is mounted on the helicopter 30. As the other processed data, the data processing portion 11 can generate the warning data for giving a warning of the approach of the target object. The data processing portion 11 may output the warning data to the avionics system 21, and the informing apparatus 24 may operate based on the warning data. As described above, the avionics system 21 includes the navigation systems, such as the INS 22 and the GPS 23. However, navigation data from the navigation systems may be output as the avionics data to the data processing portion 11. The data processing portion 11 can use the navigation data when generating the processed data, such as the image data or the warning data.

Obstacle State Display Image by Display Portion

In the support system 10A according to the present embodiment, based on the image data generated by the data processing portion 11, the display portion 13 displays an image containing a schematic image of the target object that may become an obstacle. One example of the image displayed on the display portion 13 as above will be specifically described with reference to FIGS. 3A, 3B, 4A, and 4B in addition to FIGS. 1 and 2.

In the support system 10A, the data processing portion 11 collectively stores, and with this, commonizes the acquired data (the detected data from the detecting portion 12, the taken-image data from the imaging portion(s) 14, and the avionics data from the avionics system 21). From at least the detected data and the avionics data among the acquired data, the data processing portion 11 generates target object schematic image data indicating the approach of the target object to the helicopter 30 or the possibility of the approach of the target object to the helicopter 30 and outputs the target object schematic image data to the display portion 13. Further, the data processing portion 11 generates, from the acquired data, state image data indicating the state of surroundings of the airframe 31 as a center, and outputs the state image data to the display portion 13. At this time, the target object schematic image data is generated as plural-stage image data corresponding to the distance between the helicopter 30 and the target object. There are at least three types of acquired data that are the detected data by the detecting portion 12, the taken-image data from the imaging portion(s) 14, and the avionics data from the avionics system 21. The data processing portion 11 stores this acquired data and "commonizes" this acquired data, in other words, allows the display portion 13 to utilize this acquired data, i.e., display the acquired data. Thus, the term "commonizes" denotes that the data processing portion 11 stores the acquired data and allows the display portion 13 to utilize this acquired data, i.e., display the acquired data.

Based on the target object schematic image data from the data processing portion 11, the display portion 13 displays an obstacle state display image schematically showing the state of the obstacle around the helicopter 30.

The specific configuration of the obstacle state display image is not especially limited. Typically, one example of the obstacle state display image is that, as shown in FIGS. 3A, 3B, 4A, and 4B, a circular image 40 based on the state image data and corresponding to the front, rear, left, and right directions of the airframe 31 as a center is displayed. As shown in FIGS. 3B, 4A, and 4B, a target object schematic image 42 corresponding to a circumference portion of the circular image 40 and based on the target object schematic image data is displayed in a direction corresponding to a direction in which the target object exists.

Especially, as shown in FIGS. 4A and 4B, when the target object approaches the airframe 31, the target object schematic image 42 is displayed so as to project from the circumference portion of the circular image 40 toward a center portion of the circular image 40 in accordance with stages of the target object schematic image data.

More specifically, each of FIGS. 3A, 3B, 4A, and 4B shows an obstacle display screen image 50 that is one example of the display screen image of the display portion 13. The obstacle display screen image 50 contains the obstacle state display image. A display configuration of the obstacle display screen image 50 contains the circular image 40 corresponding to the front, rear, left, and right directions of the airframe 31, and the target object schematic image 42 displayed at the circumference portion of the circular image 40.

Figure 3A:
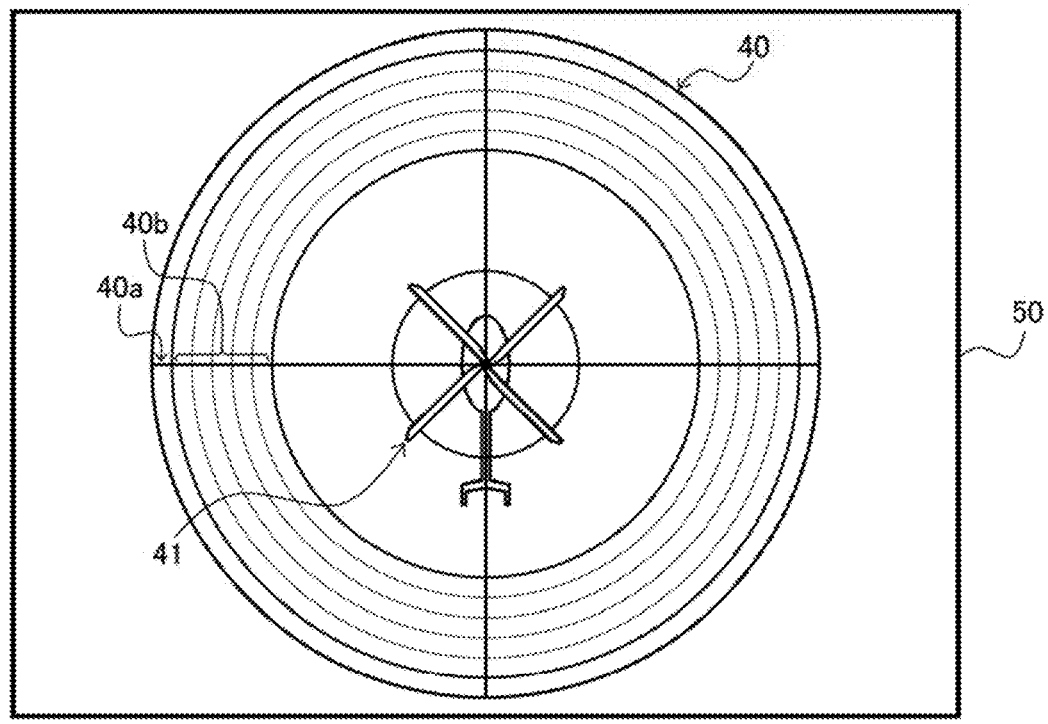
FIGS. 3A and 3B are display screen image diagrams each showing a configuration example of an obstacle display screen image displayed on a display portion of the aircraft hovering work support system shown in FIG. 1.
Figure 3B:
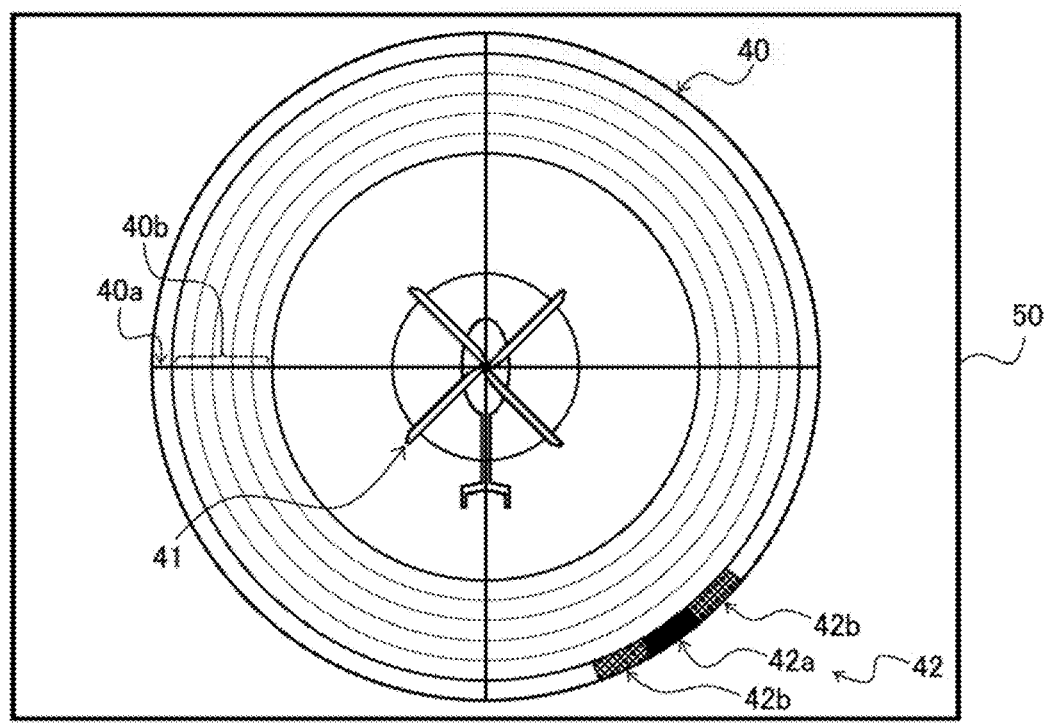
Figure 4A:
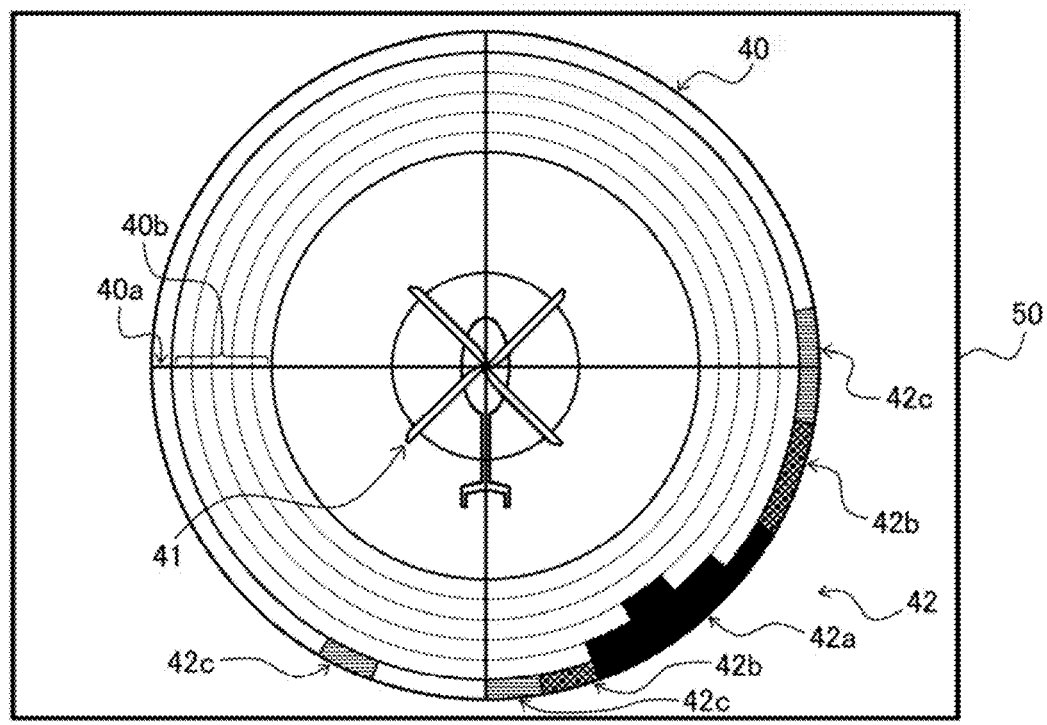
FIGS. 4A and 4B are display screen image diagrams each showing a configuration example of the obstacle display screen image displayed on the display portion of the aircraft hovering work support system shown in FIG. 1.
Figure 4B:
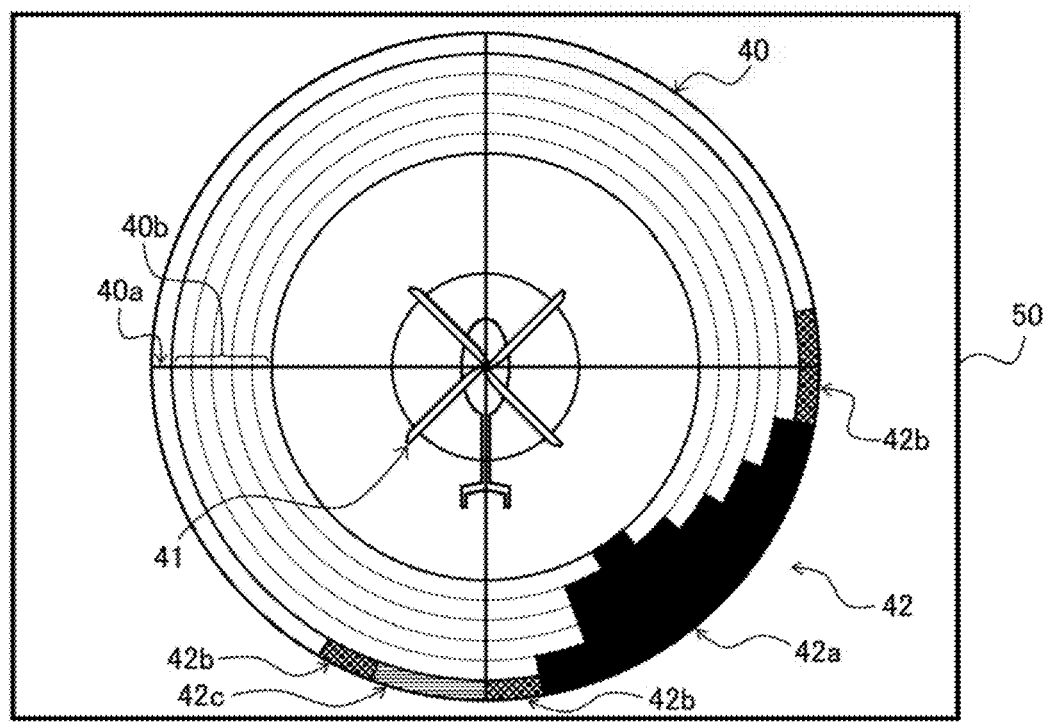

As shown in FIGS. 3A, 3B, 4A, and 4B, according to an airframe schematic image 41 at a center of the circular image 40, a nose of the airframe 31, i.e., the helicopter 30 is located at an upper side in FIG. 3A. Therefore, in the drawings, the upper side corresponds to the front direction of the helicopter 30, and the lower side corresponds to the rear direction of the helicopter 30. In addition, the left side corresponds to the left direction of the helicopter 30, and the right side corresponds to the right direction of the helicopter 30. In FIG. 3A, a near side of a paper surface (screen image) corresponds to the upper direction of the helicopter 30, and a deep side of the paper surface corresponds to the lower direction of the helicopter 30. This correspondence relation is true also in FIGS. 3B, 4A, and 4B.

The circular image 40 includes concentric circles. In the examples shown in FIGS. 3A, 3B, 4A, and 4B, an annular region 40a and a five-ring annular region 40b are displayed. The annular region 40a is located at an outermost portion of the circumference of the circular image 40, and the five-ring annular region 40b is adjacently located inside the annular region 40a. These annular regions 40a and 40b are regions where the target object schematic image 42 is displayed, and indicate the distance between the helicopter 30 and the detected target object. The annular region 40a at the outermost portion is a caution region, and the annular region 40b inside the annular region 40a is a warning region. Therefore, for convenience of explanation, the annular region 40a at the outermost portion is referred to as a "caution annular region 40a," and the annular region 40b inside the annular region 40a is referred to as a "warning annular region 40b." The warning annular region 40b is constituted by five rings arranged at regular intervals. These five rings are referred to as a first ring, a second ring, a third ring, a fourth ring, and a fifth ring in this order from an outside. The degree of warning increases in order from the first ring to the fifth ring. Therefore, the annular region 40b can display the warning by five levels.

First, in the obstacle display screen image 50 shown in FIG. 3A, only the circular image 40 and the airframe schematic image 41 are displayed, and the target object schematic image 42 is not displayed. Therefore, in the state shown in FIG. 3A, the target object that may become an obstacle does not exist around the helicopter 30.

Next, in the obstacle display screen image 50 shown in FIG. 3B, the target object schematic image 42 is displayed in the caution annular region 40a of the circular image 40 in a diagonally right rear direction when viewed from the airframe schematic image 41. In the present embodiment, in the annular regions 40a and 40b, the target object schematic image 42 can be displayed in stages by 10° angular ranges. An image of a 10° range shown in black is a first-stage image 42a, and an image of a 10° range located at each of both sides of the first-stage image 42a and shown by grid-line hatching is a second-stage image 42b.

The first-stage image 42a indicates a target object located close to the helicopter 30, and the second-stage image 42b indicates a target object located farther from the helicopter 30 than the first-stage image 42a. Further, a below-described third-stage image 42c indicates a target object located farther from the helicopter 30 than the second-stage image 42b. Therefore, the degree of caution increases in order from the third-stage image 42c to the first-stage image 42a. The stages that are the first-stage image 42a, the second-stage image 42b, and the third-stage image 42c are displayed in accordance with the stages of the target object schematic image data generated by the data processing portion 11.

As described above, in FIGS. 3B, 4A, and 4B, the first-stage image 42a is schematically shown in black. However, the first-stage image 42a may be actually shown in red, for example. Further, the second-stage image 42b is schematically shown by the grid-line hatching. However, the second-stage image 42b may be actually shown in yellow, for example. In FIGS. 4A and 4B, the third-stage image 42c is schematically shown by horizontal-line hatching. However, the third-stage image 42c may be actually shown in green, for example. As above, the target object schematic image 42 is only required to be displayed by different colors in accordance with the stages of the target object schematic image data. In the state shown in FIG. 3B, the target object that may become an obstacle exists at a position at a diagonally right rear side of the helicopter 40, i.e., a position in a relatively short distance range corresponding to the caution region.

Next, in the obstacle display screen image 50 shown in FIG. 4A, the target object schematic image 42 is displayed in a 100° range spreading from the right side of the airframe schematic image 41 to the rear side of the airframe schematic image 41, and the target object schematic image 42 is also displayed in a 10° range at a diagonally left rear side of the airframe schematic image 41. In this target object schematic image 42, the first-stage image 42a displayed at a diagonally right rear side of the airframe schematic image 41 is displayed in a 40° range so as to project from the caution annular region 40a of the circular image 40 to the second ring of the warning annular region 40b.

In the caution annular region 40a at each of both sides of the first-stage image 42a, the second-stage image 42b is displayed in a 20° range. In the caution annular region 40a located at an outside of the second-stage image 42b, the third-stage image 42c is displayed in a 20° range. Further, the third-stage image 42c is displayed in a 10° range at a diagonally left rear side of the airframe schematic image 41. In the state shown in FIG. 4A, a large target object exists in the distance range corresponding to the caution region spreading from the right side of the helicopter 30 to the rear side of the helicopter 30, and part of the target object is very close to the distance range corresponding to the second stage of the warning region at a right rear side of the helicopter 30.

Next, in the obstacle display screen image 50 shown in FIG. 4B, the target object schematic image 42 is displayed in a 130° range spreading from the right side of the airframe schematic image 41 to a diagonally left rear side of the airframe schematic image 41. In this target object schematic image 42, the first-stage image 42a displayed in a 70° range at a diagonally right rear side of the airframe schematic image 41 projects to the fifth ring of the warning annular region 40b at most. At the right side of this most projecting position, the projecting positions change in stages, i.e., the projecting positions are located at the fourth ring, the third ring, the second ring, and the first ring. On the other hand, at the left side of the most projecting position, the projecting positions are located at the fourth ring and the first ring, i.e., the left side of the most projecting position projects steeply.

In the caution annular region 40a at both sides of the first-stage image 42a, the second-stage image 42b is displayed in a 20° range at the right side of the first-stage image 42a, and the second-stage image 42b is displayed in a 10° range at the left side of the first-stage image 42a. Further, at an outside of the left-side second-stage image 42b (i.e., at the left side of the left-side second-stage image 42b; at the rear side of the helicopter 30), the third-stage image 42c is displayed in a 20° range, and at an outside of the third-stage image 42c (i.e., at the left side of the third-stage image 42c;

at a diagonally left rear side of the helicopter 30), the second-stage image 42b is displayed in a 10° range.

In the state shown in FIG. 4B, a large target object exists in the distance range corresponding to the caution region spreading from the right side of the helicopter 30 to the rear side of the helicopter 30, and part of the target object is very close to the distance range corresponding to the fifth stage of the warning region at the right rear side of the helicopter 30. Further, the right part of this large target object gently changes, but the left part of the large target object steeply changes. Part (corresponding to the position of the third-stage image 42c) of the target object at the rear side of the helicopter 30 is concave.

As above, the circular image 40 in the obstacle display screen image 50 is divided into the caution annular region 40a and the warning annular region 40b. In the caution annular region 40a located at the outermost portion, the differences of the degree of caution are shown by the types of the images. In the warning annular region 40b located inside the caution annular region 40a, the differences of the degree of warning are shown by the heights of the images in a direction toward the center portion (i.e., the differences of the degree of warning are shown by whether the projection reaches the first, second, third, fourth, or fifth ring).

When the degree of caution in the caution annular region 40a and the degree of warning in the warning annular region 40b are regarded as a change in one continuous "obstacle information importance degree" with respect to a viewer (pilot 20) of the obstacle display screen image 50, the "obstacle information importance degree" increases in order of the third-stage image 42c in the caution annular region 40a, the second-stage image 42b in the caution annular region 40a, the first-stage image 42a in the caution annular region 40a, the first-stage image 42a in the first ring of the warning annular region 40b, the first-stage image 42a in the second ring of the warning annular region 40b, the first-stage image 42a in the third ring of the warning annular region 40b, the first-stage image 42a in the fourth ring of the warning annular region 40b, and the first-stage image 42a in the fifth ring of the warning annular region 40b.

Determination of Detected Data by Data Processing Portion

Next, the determination of the detected data by the data processing portion 11 will be specifically described with reference to FIGS. 5 and 6A to 6C in addition to FIGS. 1 to 4B.

As described above, in the support system 10A according to the present embodiment, a detecting portion capable of detecting the distance data and the position data can be suitably used as the detecting portion 12. A specific example of the detecting portion 12 is the LIDAR.

As described above, since the LIDAR uses light that is an electromagnetic wave having shorter wavelength than a radar, the LIDAR can detect a smaller object than the radar. Therefore, the LIDAR is suitably used for measurements in the field of weather, such as steam, aerosol, wind and rain, and cloud. However, as in the present disclosure, in the case of detecting a larger object (target object that may become an obstacle) around the helicopter 30 when, for example, it rains or snows, the LIDAR may detect rain or snow and may not be able to appropriately detect the target object.

For example, it is snowing in the state of the obstacle display screen image 50 shown in FIG. 4A, i.e., in the state where the support system 10A detects the target object located in a 130° range spreading from the right side of the airframe schematic image 41 to a diagonally left rear side of the airframe schematic image 41. In this case, the detecting portion 12 detects snow therearound. Therefore, the existence of the target object may be strongly detected in a region where the target object does not exist. For example, as in the obstacle display screen image 50 shown in FIG. 5, the first-stage image 42a may be entirely displayed as noise.

Figure 5:
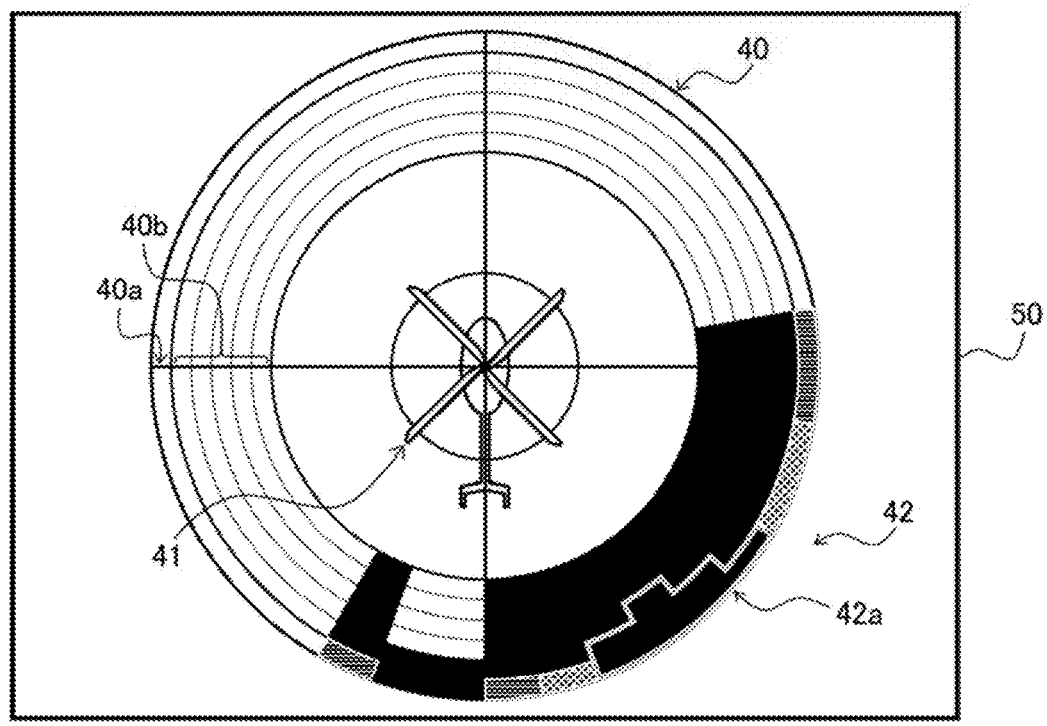
FIG. 5 is an obstacle display screen image displayed on the display portion of the aircraft hovering work support system shown in FIG. 1, i.e., a display screen image diagram showing one example in which noise is generated on the display screen image shown in FIG. 4A.

In the example shown in FIG. 5, the target object schematic image 42 surrounded by a white line in FIG. 5 indicates the target object to be actually detected (and is the same as the target object schematic image 42 shown in FIG. 4A). However, when the detecting portion 12 detects snow therearound, for example, the first-stage image 42a projecting to the fifth ring is displayed in a 100° range spreading from the right side of the airframe schematic image 41 to the diagonally left rear side of the airframe schematic image 41 and in a 10° range located at a diagonally left rear side of the airframe schematic image 41. In addition, the first-stage image 42a projecting to the first ring is displayed in a 20° range located at the rear left side where the target object is not detected.

Although not shown, in mountain areas and the like, the helicopter 30 may raise dry leaves and the like on the ground during the hovering work. When the detecting portion 12 is the LIDAR, the detecting portion 12 may detect the dry leaves and the like, and as a result, the display portion 13 may display the raised dry leaves and the like as the target object schematic image 42.

When the detecting portion 12 performs detecting operations of the same region or the same target plural times, ideally, the detecting portion 12 can detect the target object that may become an obstacle, in each of the detecting operations performed plural times. On the other hand, when the detecting portion 12 detects minute objects, such as rain, snow, or dry leaves, which temporarily exist around the helicopter 30, the detecting portion 12 detects the minute objects only in some of all the detecting operations performed plural times. Therefore, it is determined that the number of times of the detection of the minute objects that exist temporarily is smaller than the number of times of the detection of the target object that may become an obstacle.

Figure 6C:
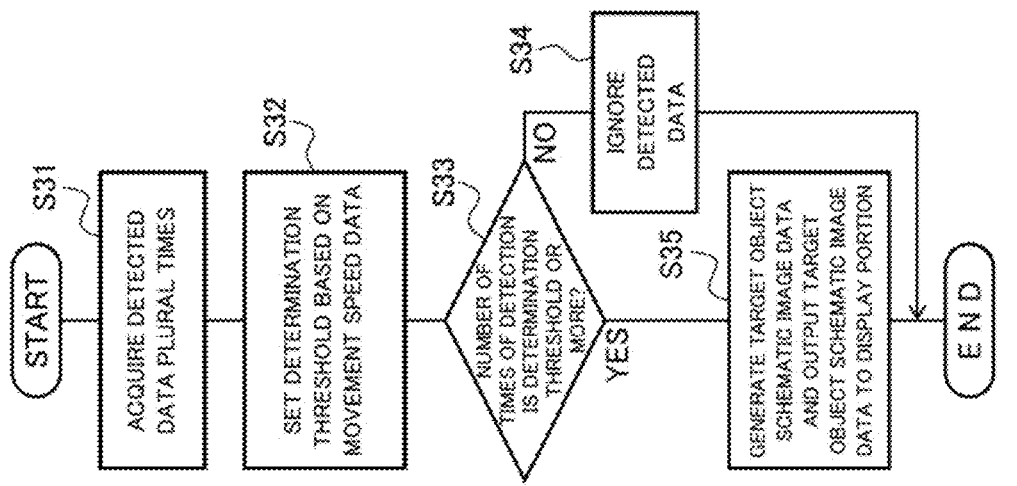
FIGS. 6A to 6C are flowcharts each showing an example in which target object schematic image data is generated by a data processing portion included in the aircraft hovering work support system shown in FIG. 1.
Figure 6B:
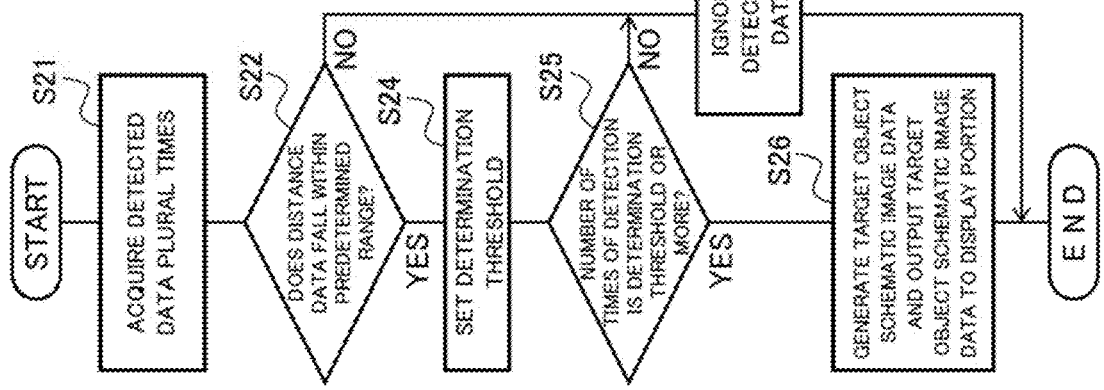
Figure 6A:
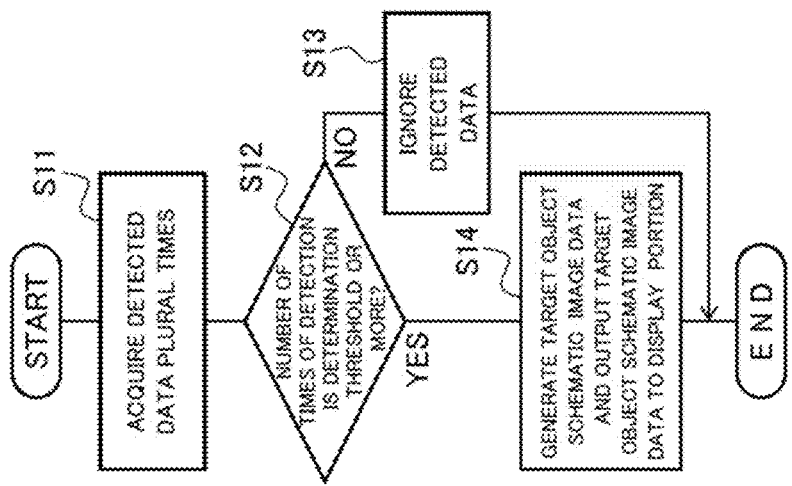

Therefore, in the present embodiment, the data processing portion 11 determines whether or not the number of times of the detection of the detected data of the same region or the same target by the detecting portion 12 is a preset determination threshold or more. When the detecting portion 12 is the LIDAR, the detecting portion 12 measures the distance data and the position data by irradiating the target object with the pulsed laser and acquiring its reflected wave. Therefore, for example, as shown in the flowchart of FIG. 6A, the data processing portion 11 acquires the detected data of the same distance and the same position from the detecting portion 12 plural times within a predetermined period of time (Step S11). Then, the data processing portion 11 determines whether or not the number of times of the detection of the detected data acquired plural times is the determination threshold or more (Step S12).

When the number of times of the detection is less than the determination threshold (NO in Step S12), it is determined that the detecting portion 12 detects the minute objects, such as rain, snow, or dry leaves raised by wind, which temporarily exist around the helicopter 30. Therefore, the data processing portion 11 ignores the detected data (Step S13) and does not generate the target object schematic image data.

In contrast, when the number of times of the detection is the determination threshold or more (YES in Step S12), it is determined that the detecting portion 12 detects the target object that may become an obstacle, not the minute objects that temporarily exist around the helicopter 30. Then, the data processing portion 11 generates the target object schematic image data by using the detected data and the avionics data (and also using the other acquired data, such as the taken-image data, according to need) and outputs the target object schematic image data to the display portion 13 (Step S14). With this, the display portion 13 does not display the obstacle display screen image 50 of FIG. 5 in which the first-stage image 42a is entirely displayed as the noise. The display portion 13 can display the obstacle display screen image 50 of FIG. 4A in which the noise is eliminated or reduced.

As an example which is not to improperly limit the invention, the detected data containing the distance data that indicates less than 8 meters or more than 40 meters is not subjected to the determination. When the movement distance of the helicopter 30 within a period of time obtained by multiplying the predetermined period of time by two is one meter or more, a reference threshold is set to two, and when it is less than one meter, the reference threshold is set to four, for example. The determination threshold for the detected data containing the distance data that indicates 8 meters or more and less than 10 meters is obtained by "Determination threshold=Reference threshold×4. The determination threshold for the detected data containing the distance data that indicates 10 meters or more and 40 meters or less is obtained by "Determination threshold=Reference threshold×40/distance [meters]. Further, the predetermined period of time is set to 0.5 seconds.

The determination threshold may be fixed as a preset number of times of the detection but may be suitably set in accordance with the state of the hovering of the helicopter 30. With this, the appropriateness of the detected data can be determined more efficiently or properly. For example, as shown in the flowchart of FIG. 6B, the determination threshold is set after whether or not the distance data contained in the detected data falls within a predetermined range is determined. As shown in the flowchart of FIG. 6C, the determination threshold is set in accordance with the movement speed data of the helicopter 30.

For example, it is determined that the detected data acquired from the position quite close to the helicopter 30 is the detection result of the minute objects that temporarily exist, not the detection result of the target object that may become an obstacle. Further, the detected data acquired from the position quite far from the helicopter 30 is ignorable as the target object that may become an obstacle even if the object is not the minute objects that exist temporarily. Therefore, for example, as shown in the flowchart of FIG. 6B, after the data processing portion 11 acquires the detected data from the detecting portion 12 plural times within a predetermined period of time (Step S21), the data processing portion 11 determines whether or not the distance data contained in the detected data falls within a predetermined range (Step S22).

When the distance data falls outside the predetermined range (NO in Step S22), it is determined that the detected data is acquired from the position quite close to or quite far from the helicopter 30. Therefore, the data processing portion 11 ignores the detected data (Step S23) and does not generate the target object schematic image data. In contrast, when the distance data falls within the predetermined range (YES in Step S22), the data processing portion 11 sets the determination threshold in accordance with the value of the distance data (Step S24).

For example, when the value of the distance data indicates a position relatively close to the helicopter 30, the detected data containing this distance data may indicate the minute objects that exist temporarily. Further, since the distance to the helicopter 30 is short, the number of times of the detection may become relatively large even in the case of the minute objects that exist temporarily. Therefore, when the distance is short, the determination threshold can be set high. Further, when the value of the distance data indicates a position far from the helicopter 30, the number of times of the detection of, for example, snow particles is relatively smaller than that of the object that may become an obstacle. Therefore, as the distance data increases, the determination threshold can be set to gradually decrease.

After that, the data processing portion 11 determines based on the set determination threshold whether or not the number of times of the detection of the detected data is the determination threshold or more (Step S25). When the number of times of the detection of the detected data is less than the determination threshold (NO in Step S25), the data processing portion 11 ignores the detected data (Step S23) and does not generate the target object schematic image data. In contrast, when the number of times of the detection of the detected data is the determination threshold or more (YES in Step S25), the data processing portion 11 generates the target object schematic image data by using the detected data and the avionics data (and also using the other acquired data, such as the taken-image data, according to need) and outputs the target object schematic image data to the display portion 13 (Step S26).

For example, even while the helicopter 30 is hovering, the helicopter 30 may sideslip in a predetermined direction depending on the state of the hovering work. Herein, for example, when it is assumed that the detecting portion 12 (LIDAR) irradiates a predetermined region based on a global coordinate system with the pulsed laser, the probability of irradiating the predetermined region with the pulsed laser decreases due to a change in the posture of the helicopter 30 (the posture of the detecting portion 12). Therefore, the determination threshold is set in accordance with the movement speed of the helicopter 30 in consideration of the probability of irradiating the predetermined region with the pulsed laser. With this, the accuracy of the determination of the detected data can be improved.

For example, as shown in the flowchart of FIG. 6C, after the data processing portion 11 acquires the detected data from the detecting portion 12 plural times within a predetermined period of time (Step S31), the data processing portion 11 sets the determination threshold based on the movement speed data of the helicopter 30 (Step S32) and determines based on the set determination threshold whether or not the number of times of the detection of the detected data is the determination threshold or more (Step S33). The movement speed data may be contained in the detected data, or the data processing portion 11 may calculate the movement speed based on, for example, the detected data. Or, for example, the data, such as the navigation data that is the avionics data, contained in the acquired data of the data processing portion 11 may be utilized.

When the number of times of the detection of the detected data is less than the determination threshold (NO in Step S33), the data processing portion 11 ignores the detected data (Step S34) and does not generate the target object schematic image data. In contrast, when the number of times of the detection of the detected data is the determination threshold or more (YES in Step S33), the data processing portion 11 generates the target object schematic image data by using the detected data and the avionics data (and also using the other acquired data, such as the taken-image data, according to need) and outputs the target object schematic image data to the display portion 13 (Step S35).

Each of the flowcharts shown in FIGS. 6B and 6C includes a step of setting the determination threshold based on the distance data or the movement speed data. Herein, setting the determination threshold denotes not only setting a specific numerical value (number of times) but also selecting one of a plurality of present determination thresholds based on the value of the distance data or the value of the movement speed data. Further, the determination process of the flowchart shown in FIG. 6B and the determination process of the flowchart shown in FIG. 6C may be used in combination. One example may be such that after it is determined whether or not the distance data of the acquired detected data falls within a predetermined range, the value of the movement speed data is determined, and the determination threshold is set.

Specific Example of Display Screen Image of Display Portion

Next, one example of the obstacle display screen image 50 displayed on the display portion 13 and an entire display screen image including the obstacle display screen image 50 will be specifically described with reference to FIGS. 7 and 8.

In the present embodiment, as shown in FIGS. 1 and 2, the pad-type or tablet mobile terminal (mobile terminal) 13A and the head mount display (HMD) 13B are used as the display portion 13. The mobile terminal 13A does not have to be fixedly mounted on the pilot seat 34 of the helicopter 30. As schematically shown in FIG. 2, the mobile terminal 13A is only required to be detachably attached to a position within the field of view of the pilot 20. The HMD 13B is only required to be attached to the head of the pilot 20.

The pilot 20 does not always view the mobile terminal 13A and the HMD 13B but glances at the mobile terminal 13A and the HMD 13B according to need for reference, i.e., for confining the state of the obstacle during the hovering. Therefore, the display screen image of the display portion 13 is only required to display the obstacle state display image (image containing the circular image 40, the target object schematic image 42, and the like) as shown in FIGS. 3A, 3B, 4A, 4B, and 5. Further, other information useful for the pilot 20 during the hovering may be displayed on the display screen image of the display portion 13 together with the obstacle state display image.

Figure 7:
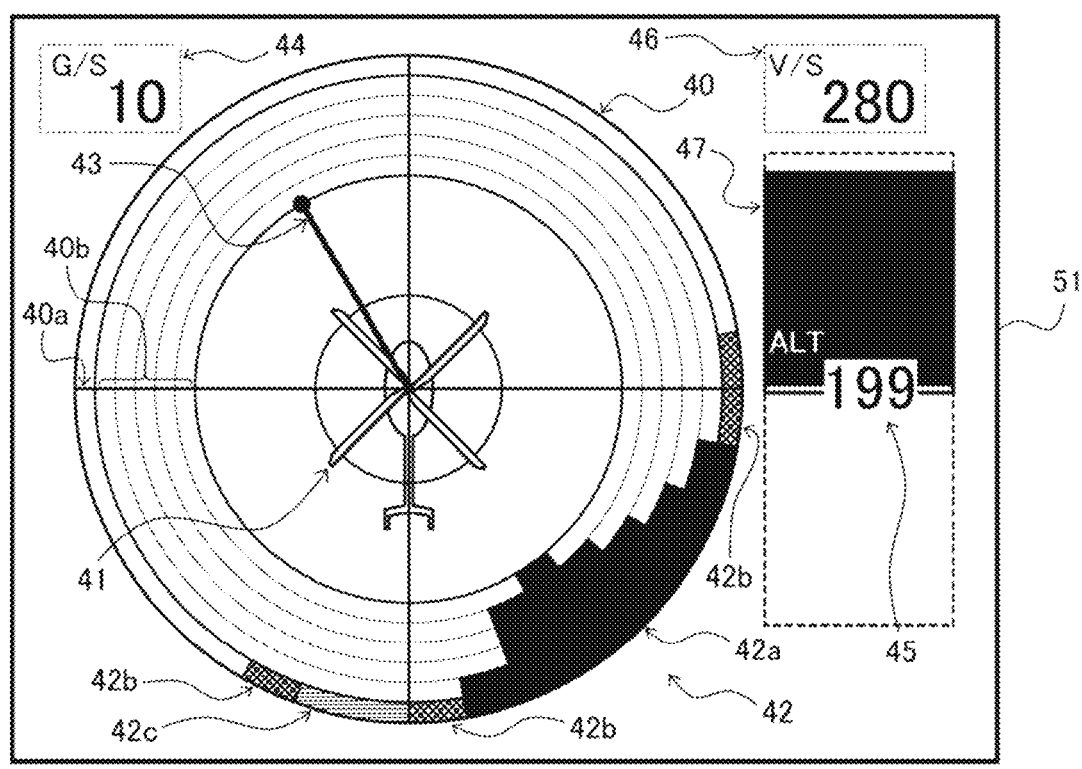
FIG. 7 is a display screen image diagram showing a more specific example of a display screen image displayed on the display portion of the aircraft hovering work support system shown in FIG. 1.

Typically, as shown in FIG. 7, each of the mobile terminal 13A and the HMD 13B may be configured to display an obstacle display screen image 51 in which various instrument data is displayed around the obstacle state display image (the circular image 40, the target object schematic image 42, and the like). The instrument data is not especially limited, and typical examples of the instrument data include a ground speed, a pressure altitude, an ascending/descending ratio, and a sideslip angle. The instrument data is only required to be displayed on the display portion 13 based on instrument data image data generated by the data processing portion 11. The data processing portion 11 is only required to generate the instrument data image data based on the avionics data (especially the navigation data) and/or the detected data.

In the example shown in FIG. 7, the circular image 40 (and the airframe schematic image 41 and the target object schematic image 42) is displayed at a center-left region in the display screen image, and a ground speed vector image 43, a ground speed numerical value image 44, a pressure altitude numerical value image 45, an ascending/descending ratio numerical value image 46, and an ascending/descending ratio bar image 47 are also displayed as instrument data images.

The ground speed vector image 43 is a vector-shaped image which is displayed at a position overlapping the airframe schematic image 41 located at the center of the circular image 40 and extends from the center of the circular image 40 toward an outside. The angle of the vector indicates the sideslip angle, and the length of the vector indicates the magnitude of the ground speed. In the example of FIG. 7, the helicopter 30 is sideslipping in a diagonally left front direction. The length of the ground speed vector image 43 is not especially limited and is only required to be such a length that the viewer (pilot 20) can recognize the magnitude of the ground speed. In the example shown in FIG. 7, a tip end of the ground speed vector image 43 is located at a position overlapping an inner circumference of the annular region 40b of the circular image 40 but may overlap the circular image 40.

In the example shown in FIG. 7, the ground speed numerical value image 44 is located at a region surrounded by a dotted line at an upper left side of the circular image 40 and displays the ground speed (abbreviated as G/S) corresponding to the length of the ground speed vector image 43 by a numerical value (in FIG. 7, "$^{G/S}10$" is displayed). In the example shown in FIG. 7, the pressure altitude numerical value image 45 is located at a right side of the circular image 40 and displays the pressure altitude (abbreviated as ALT) by a numerical value (in FIG. 7, "$^{ALT}199$" is displayed). In the example shown in FIG. 7, the ascending/descending ratio numerical value image 46 is located at a region surrounded by a dotted line at an upper right side of the circular image 40 and displays the ascending/descending ratio (abbreviated as V/S) by a numerical value (in FIG. 7, "$^{V/S}280$" is displayed). In FIG. 7, each of the ground speed numerical value image 44 and the ascending/descending ratio numerical value image 46 is shown as the region surrounded by a thin dotted line. However, the region surrounded by the thin dotted line is used for convenience sake, and actually, the ground speed numerical value image 44 and the ascending/descending ratio numerical value image 46 are abbreviated and displayed only by the numerical values.

In the example shown in FIG. 7, the ascending/descending ratio bar image 47 is displayed at the right side of the circular image 40 in the form of a bar (band) that can expand and contract upward or downward based on a white line overlapping the pressure altitude numerical value image 45. To be specific, the ascending/descending ratio bar image 47 indicates the ascending/descending ratio by the length of the bar (band) instead of the numerical value. The bar expanding upward indicates a positive (plus) ascending/descending ratio, and the bar expanding downward indicates a negative (minus) ascending/descending ratio. In FIG. 7, a region shown by upper and lower broken lines corresponds to a maximum displayable region of the bar.

As above, the above-described instrument data is displayed in the obstacle display screen image 51 together with the obstacle state display image. With this, the pilot 20 can refer to the data for the piloting during the hovering. The instrument data displayed in the obstacle display screen image 51 is not limited to the ground speed, the pressure altitude, the ascending/descending ratio, and the sideslip angle. The other instrument data may be displayed, or some of the instrument data may not be displayed. In the example shown in FIG. 7, the ground speed, the pressure altitude, and the ascending/descending ratio are displayed by the numerical values, but the ground speed, the sideslip angle, and the ascending/descending ratio are displayed by images, such as the vector and the bar. Therefore, the other instrument data may be displayed by an image instead of a numerical value.

Figure 8:
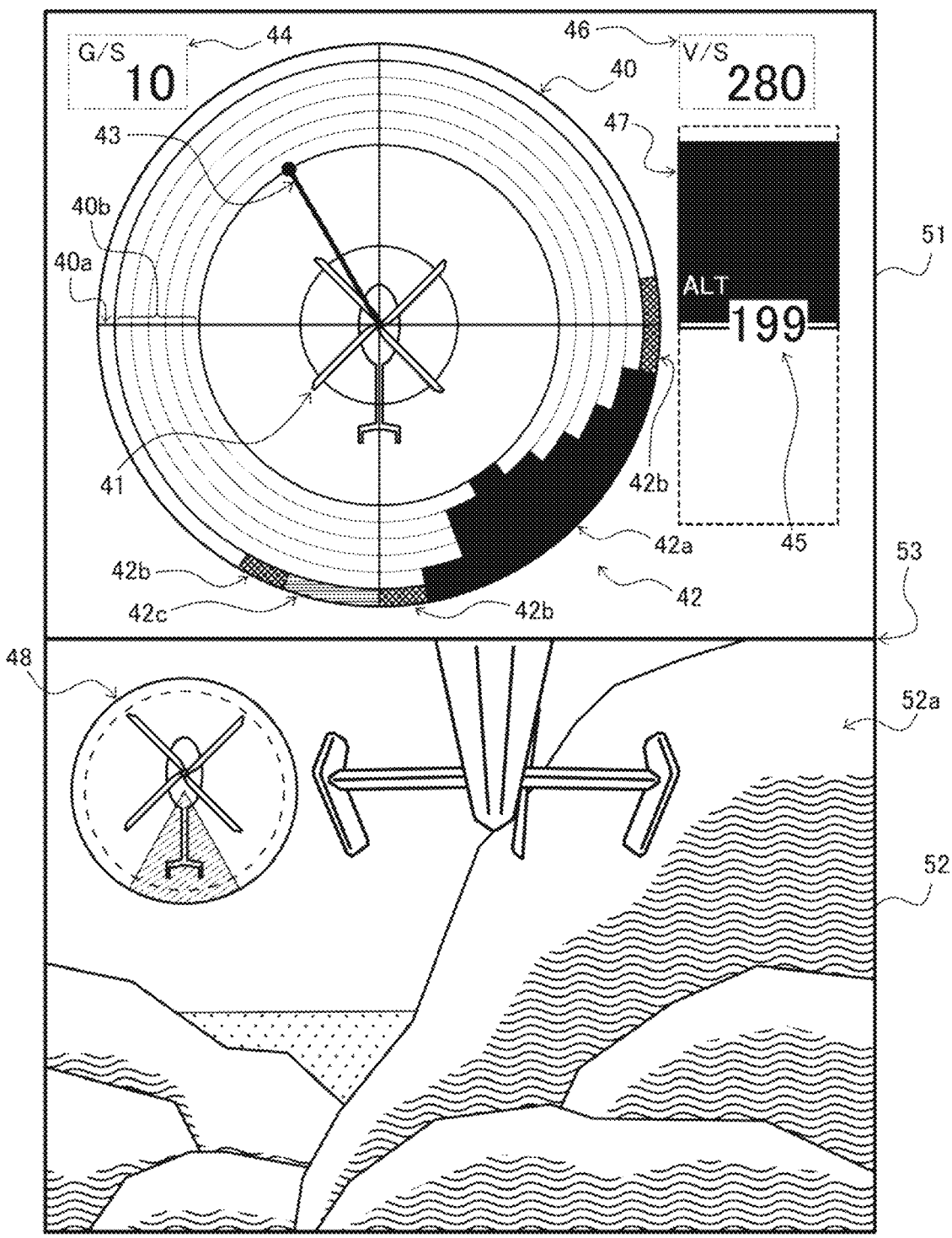
FIG. 8 is a display screen image diagram showing a more specific example of another display screen image displayed on the display portion of the aircraft hovering work support system shown in FIG. 1.

When the mobile terminal 13A is attached to the pilot seat 34 such that the display screen image thereof becomes a vertically long state (i.e., a longitudinal direction of the mobile terminal 13A extends along a vertical direction), as shown by a mobile terminal display screen image 53 in FIG. 8, the obstacle display screen image 51 that is the same as FIG. 7 may be displayed at an upper side in the display screen image, and for example, an imaging portion display screen image 52 taken by the imaging portion 14 may be displayed at a lower side in the display screen image. In the example shown in FIG. 8, a rear-side taken image 52a taken by the rear-side imaging portion 14A is displayed in the imaging portion display screen image 52. For example, the imaging portion display screen image 52 may be able to be switched by an operation of the pilot 20 from the rear-side taken image 52a shown in FIG. 8 to a lower-side taken image taken by the lower-side imaging portion 14B.

The data processing portion 11 may generate taken image display data based on the taken-image data acquired from the imaging portion 14 and output the taken image display data to the display portion 13. Or, the data processing portion 11 may output the taken-image data to the display portion 13 without substantially processing the taken-image data depending on the type of the taken-image data. The display portion 13 is only required to be able to display both the taken image based on the taken-image data (or the taken image display data) and the obstacle state display image on the same screen image in parallel. Therefore, the configuration of the mobile terminal display screen image 53 is not limited to the configuration of FIG. 8 in which the screen image is divided into upper and lower parts.

As shown in FIG. 8, for example, an imaging direction schematic image 48 may be displayed at an upper left side in the imaging portion display screen image 52. For example, the imaging direction schematic image 48 is designed such that: an image showing the airframe 31 in the same manner as the airframe schematic image 41 is displayed in a small circular image; and an image showing an imaging direction by diagonal line is displayed in an overlapping manner. In the example shown in FIG. 8, since the image displayed in the imaging portion display screen image 52 is the rear-side taken image 52a, the imaging direction schematic image 48 shows that the image of the rear side of the airframe 31 is being taken.

In the present embodiment, the support system 10A includes a plurality of imaging portions 14, such as the rear-side imaging portion 14A and the lower-side imaging portion 14B. In this case, as described above, the taken images of the imaging portions 14 can be switched in the imaging portion display screen image 52 at the lower side in the mobile terminal display screen image 53. Therefore, in order to make it clear that the taken image that is currently displayed is supplied from which of the imaging portions 14, the imaging direction schematic image 48 may be displayed in part of the taken image. Further, instead of the imaging direction schematic image 48, a letter(s) indicating the imaging direction or the type of the imaging portion 14 may be simply displayed (in the example shown in FIG. 8, letters, such as "lower-side imaging portion," are only required to be displayed).

As shown in FIG. 8, both the obstacle state display image and the taken image may be displayed in the display screen image of the HMD 13B in parallel. It should be noted that the HMD 13B is mounted on the head of the pilot 20 and displays a screen image in front of the eyes of the pilot 20. Therefore, the amount of information displayed on the display screen image of the HMD 13B may be made smaller than that displayed on the display screen image of the mobile terminal 13A. One example may be such that: only the obstacle display screen image 51 shown in FIG. 7 is displayed as the display screen image of the HMD 13B; and the obstacle display screen image 51 is switched to the taken image of the imaging portion 14 by the operation of the pilot 20.

Further, the support system 10A may be configured such that an annotation image is displayed so as to overlap the taken image displayed in the imaging portion display screen image 52. Specifically, for example, as described above, the data processing portion 11 generates the target object schematic image data from at least the detected data and the avionics data among the acquired data and outputs the target object schematic image data to the display portion 13. However, the data processing portion 11 may generate annotation image data of the annotation image displayed so as to overlap the taken image, together with the generation of the target object schematic image data, and may output the annotation image data to the display portion 13 together with the target object schematic image data. With this, the display portion 13 displays the annotation image based on the annotation image data such that the annotation image overlaps the taken image.

The specific type of the annotation image is not especially limited and is only required to be an image which is useful for the viewer (pilot 20) of the imaging portion display screen image 52 or can alert the viewer (pilot 20). Examples of the annotation image include a figure, a sign, a letter, image processing of part of the taken image, and combinations thereof. As described above, the imaging portion display screen image 52 can be displayed together with the obstacle display screen image 51 in parallel. Therefore, as shown in FIG. 9, examples of the annotation image include marking images 54a and 54b corresponding to the target object schematic image 42.

Figure 9:
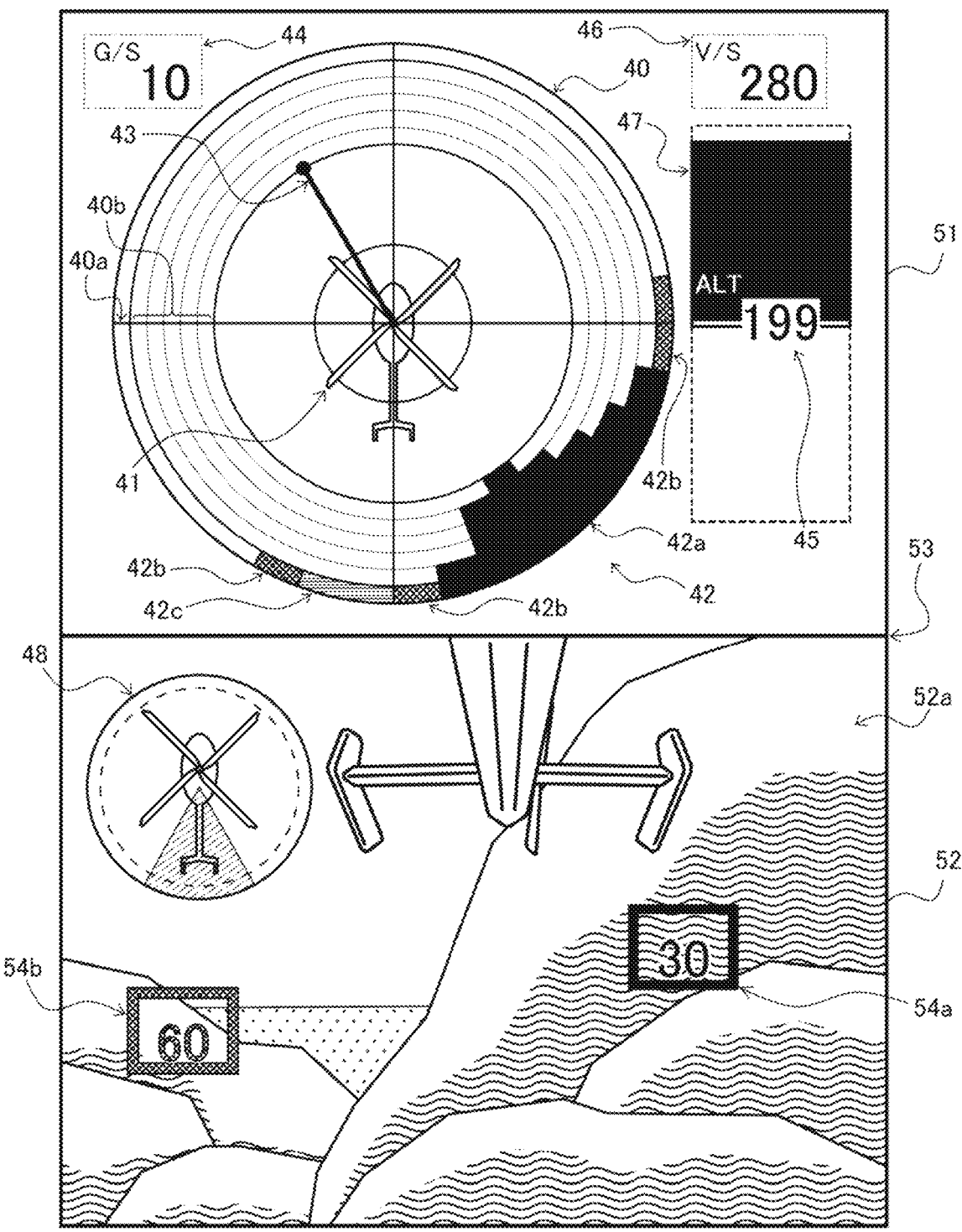
FIG. 9 is a display screen image diagram showing another specific example of the another display screen image displayed on the display portion of the aircraft hovering work support system shown in FIG. 1.

As with FIG. 8, the rear-side taken image 52a is displayed in the imaging portion display screen image 52 shown in FIG. 9. The obstacle display screen image 51 is shown at the upper side of the imaging portion display screen image 52. The existence of the target object that may become an obstacle at a diagonally right rear side of the airframe 31 is displayed by the first-stage image 42a. Herein, a first-stage marking image 54a is only required to be displayed so as to emphasize the target object that may become an obstacle displayed in the rear-side taken image 52a. In the example shown in FIG. 9, the first-stage marking image 54a is displayed as an image of a numeral in a rectangular box at a position of part of the target object which part is located closest to the airframe 31.

In the present embodiment, the first-stage image 42a is displayed in red, for example. In FIG. 9 (and FIGS. 3B, 4A, 4B, 5, 7, and 8), the first-stage image 42a is schematically shown in black. Therefore, the first-stage marking image 54a (the rectangular box and the numeral) corresponding to the first-stage image 42a is only required to be displayed also in red (in the drawings, in black). Further, for example, the numeral in the rectangular box is only required to indicate a distance from the airframe 31. The example shown in FIG. 9 displays that the target object exists at a diagonally right rear side of the airframe 31 at a position away from the helicopter 30 by about 30 meters.

Similarly, a second-stage marking image 54*b* corresponding to the second-stage image 42*b* of the obstacle display screen image 51 is displayed in the imaging portion display screen image 52 shown in FIG. 9. In the present embodiment, the second-stage image 42*b* is displayed in yellow, for example. In FIG. 9, etc., the second-stage image 42*b* is schematically displayed by the grid-line hatching. Therefore, the second-stage marking image 54*b* (the rectangular box and the numeral) is only required to be displayed also in yellow (in the drawings, by the grid-line hatching). The example shown in FIG. 9 displays that the target object exists at a diagonally left rear side of the airframe 31 at a position away from the helicopter 30 by about 60 meters.

Modified Examples, Etc.

As above, in the support system 10A according to the present disclosure, the data processing portion 11 generates the target object schematic image data by using the data acquired from at least the detecting portion 12 and the avionics system 21. Based on the target object schematic image data, the display portion 13 displays the obstacle state display image containing a schematic image of the target object that may become an obstacle. Since the target object schematic image data is generated by using not only the detected data acquired from the detecting portion 12 but also the avionics data of the helicopter 30, the target object schematic image data is image data having more excellent accuracy. With this, the pilot 20 can easily recognize the presence or absence of the obstacle around the aircraft or the state of the approach of the obstacle only by temporarily confirming the display portion 13 during the hovering. Therefore, during the hovering work of the aircraft capable of hovering, the pilot 20 can properly recognize the existence of the obstacle.

In the support system 10A according to the present disclosure, the data processing portion 11 generates the state image data and the target object schematic image data from the data acquired from at least the detecting portion 12 and/or the avionics system 21, and the display portion 13 displays, based on the state image data and the target object schematic image data, the circular image 40 and the plural-stage target object schematic image 42 which show the state around the aircraft. Especially, the target object schematic image 42 is displayed so as to project toward the airframe 31 from a direction corresponding to a direction of the existence of the target object as the target object approaches. With this, the pilot 20 can easily recognize the presence or absence of the obstacle around the aircraft or the state of the approach of the obstacle only by temporarily confirming the display portion 13 during the hovering. Therefore, the pilot 20 can properly recognize the existence of the obstacle during the hovering work of the aircraft capable of hovering.

The present disclosure is not limited to the support system 10A configured as above. In the present embodiment described above, as schematically shown in FIG. 2, the support system 10A can be retrofitted to the helicopter 30. Therefore, in the support system 10A configured as above, the detecting portion 12, the display portion 13, the imaging portions 14, and the data processing portion 11 are only required to be configured as independent apparatuses which are attachable to the airframe 31 of the helicopter 30 (aircraft capable of hovering). However, in the support system 10A, some of the detecting portion 12, the display portion 13, the imaging portions 14, and the data processing portion 11 may be configured as independent apparatuses, and the other may be mounted on the helicopter 30 in advance.

For example, the display portion 13 may be a piloting display system provided at a piloting panel of the pilot seat 34, not the mobile terminal 13A and the HMD 13B. Further, the data processing portion 11 may be a calculating unit or processor or circuitry included in the avionics system 21 of the helicopter 30, not an independent calculating device. In this case, the data processing portion 11 may be realized as software in such a manner that the calculating unit or processor or circuitry of the avionics system 21 reads a program that realizes the data processing portion 11.

Figure 10:
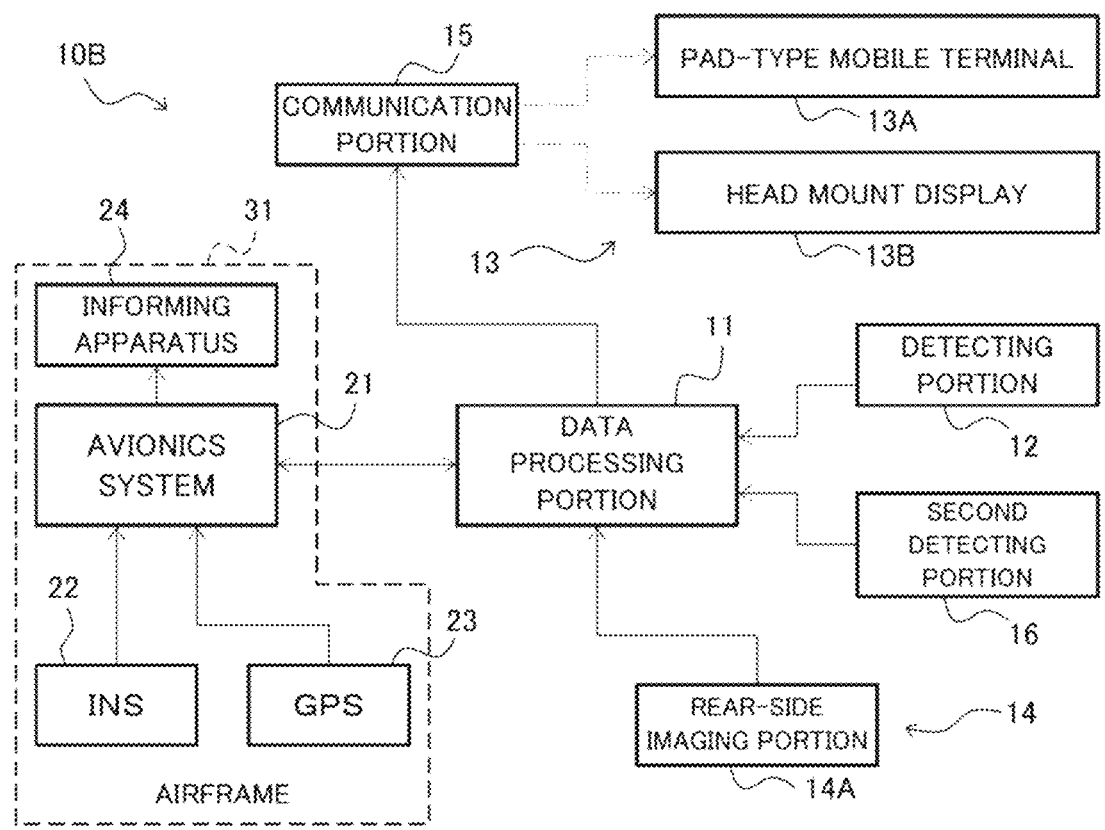
FIG. 10 is a schematic block diagram showing another configuration example of the aircraft hovering work support system shown in FIG. 1.

In the examples shown in FIGS. 1 and 2, as the imaging portions 14, the support system 10A includes the rear-side imaging portion 14A provided at the rear portion of the airframe 31 and the lower-side imaging portion 14B provided at the lower portion of the airframe 31. However, the positions and types of the imaging portions 14 are not limited to these. For example, the present disclosure may include a support system 10B including only the rear-side imaging portion 14A as the imaging portion 14 as shown in FIG. 10 and a support system 10C including the rear-side imaging portion 14A, the lower-side imaging portion 14B, and a lateral-side imaging portion 14C as the imaging portion 14 as shown in FIG. 11.

Figure 11:
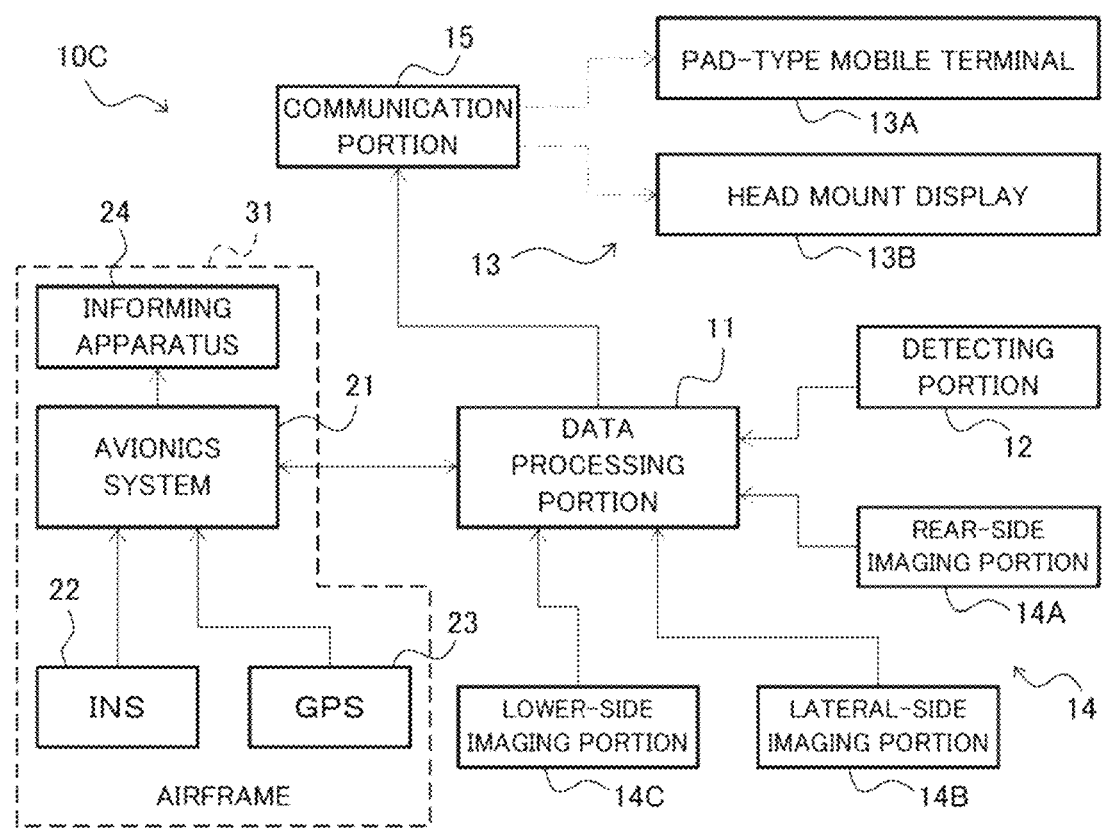
FIG. 11 is a schematic block diagram showing yet another configuration example of the aircraft hovering work support system shown in FIG. 1.

As shown in FIGS. 1 and 11, when the helicopter 30 includes a plurality of imaging portions 14, and the imaging portions 14 can take images in different directions around the airframe 31, the display portion 13 may be configured to automatically display the taken image of the target object that may become an obstacle. Specifically, among the plurality of imaging portions 14, one imaging portion that is taking the image of the target object is referred to as a "specific imaging portion" for convenience sake. In this case, the display portion 13 is only required to display both the obstacle state display image (the circular image 40 and the target object schematic image 42) and the taken image, which is based on the taken-image data taken by the specific imaging portion, on the same screen image in parallel.

For example, in the support system 10C shown in FIG. 11, as described above, the rear-side imaging portion 14A, the lower-side imaging portion 14B, and the lateral-side imaging portion 14C are included as the plurality of imaging portions 14. In a block diagram of FIG. 11, the lateral-side imaging portion 14C is shown by a single block. However, when an imaging portion (right-side imaging portion) configured to take an image of the right side of the airframe 31 and an imaging portion (left-side imaging portion) configured to take an image of the left side of the airframe 31 are included as the lateral-side imaging portions 14C, the support system 10C includes four imaging portions 14 in total.

The following will describe an example in which while the left-side imaging portion is taking the image of the left side of the airframe 31, the approach of the target object that may become an obstacle occurs at a diagonally right rear side of the airframe 31. In this case, at first, as shown at a left side in FIG. 12, the same image as FIG. 7 or FIG. 8 (or FIG. 9) is displayed in the obstacle display screen image 51 displayed at an upper side in the mobile terminal display screen image 53, and a lateral-side taken image 52*b* taken by the left-side imaging portion is displayed in the imaging portion display screen image 52 displayed at a lower side in the mobile terminal display screen image 53. The imaging direction schematic image 48 is displayed at the upper left side in the imaging portion display screen image 52 as with FIG. 8 (or FIG. 9), and the imaging direction corresponds to the left side of the airframe 31.

The data processing portion 11 generates the target object schematic image data for displaying that the target object is approaching at a diagonally right side of the airframe 31. Then, for example, in accordance with the generation of the target object schematic image data, the data processing portion 11 is only required to: select the rear-side imaging portion 14A, which is taking (or may be taking) the image of the target object, from the plurality of imaging portions 14; generate a command (taken-image data switching command) for switching from the taken-image data of the left-side imaging portion to the taken-image data of the rear-side imaging portion 14A; and output the command to the display portion 13 (mobile terminal 13A).

Figure 12:
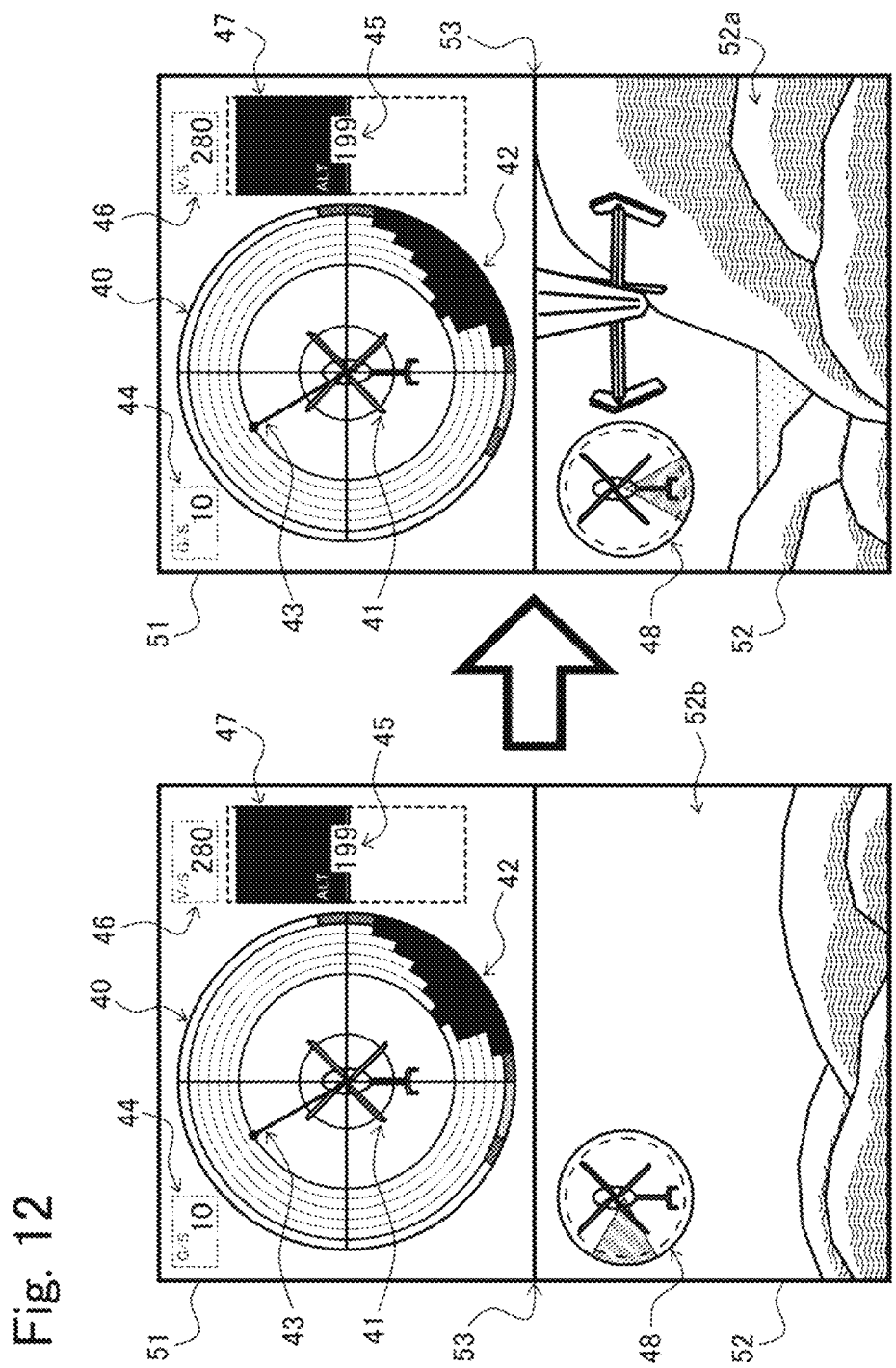
FIG. 12 is a schematic diagram showing one example in which the display screen image displayed on the display portion of the aircraft hovering work support system shown in FIG. 11 is switched.

As described above, in the mobile terminal display screen image 53 displayed on the mobile terminal 13A, at first, the lateral-side taken image 52b is displayed in the imaging portion display screen image 52 located at the lower side (see the left side in FIG. 12). When the taken-image data switching command is output from the data processing portion 11 to the mobile terminal 13A, the lateral-side taken image 52b is switched to the rear-side taken image 52a (that is the same as FIG. 8 or FIG. 9) in the imaging portion display screen image 52 located at the lower side as shown in the right side in FIG. 12.

The display portion 13 is only required to display both the obstacle state display image and the taken image, which is based on the taken-image data taken by the specific imaging portion, on the same screen image in parallel. Therefore, the present disclosure is not limited to the configuration of switching the taken image displayed in the imaging portion display screen image 52. One example may be such that: at first, the imaging portion display screen image 52 is not displayed in the mobile terminal display screen image 53, and only the obstacle display screen image 51 is displayed in the mobile terminal display screen image 53 (see FIG. 7); and after that, when the target object that may become an obstacle approaches, and the first-stage image 42a is displayed in the obstacle display screen image 51, the imaging portion display screen image 52 is displayed at the lower side in the obstacle display screen image 51.

In the present embodiment, the support system 10A includes only one detecting portion 12. However, the support system 10A may include a plurality of detecting portions 12. For example, as in the support system 10B shown in FIG. 10, a second detecting portion 16 may be included in addition to the detecting portion 12. The second detecting portion 16 may be the same type of sensor (for example, a LIDAR) as the detecting portion 12 or may be a different type of sensor (for example, a radar). Further, when the plurality of detecting portions 12, such as the detecting portion 12 and the second detecting portion 16, are different in type from each other, the plurality of detecting portions 12 may be provided at the same position or may be provided at different positions. For example, when the detecting portion 12 is provided on the upper surface of the tail portion 33 as described above (see FIG. 2), the second detecting portion 16 may be provided at the body portion 32 although not shown.

In the present embodiment, as described above, the data processing portion 11 can generate the warning data in addition to the image data from the acquired data, and the informing apparatus 24 mounted on the helicopter 30 can operate based on the warning data. The informing apparatus 24 is, for example, a warning light, a sound alarm device, or a piloting display system, but is not limited to these. Another example of the informing apparatus 24 is a vibration apparatus provided at a control stick.

When the detecting portion 12 detects the approach of the target object, and the data processing portion 11 generates the warning data together with the image data and outputs the data to the avionics system 21, the vibration apparatus that is the informing apparatus 24 operates to vibrate the control stick. With this, the pilot 20 can recognize the approach of the target object by the vibration of the control stick in addition to the image of the warning on the display portion 13, the informing of the light emission of the warning light, and the informing of the sound of the sound alarm device. The sound alarm device may be configured to emit not only warning sound or warning message sound but also warning sound from an approaching direction of the target object by stereophonic sound (3D sound field).

In the present embodiment, the data processing portion 11 generates the target object schematic image data by using the detected data acquired from the detecting portion 12 and the avionics data acquired from the avionics system 21. However, the generation of the target object schematic image data is not limited to this, and the target object schematic image data is only required to be generated by using at least the detected data and the avionics data. For example, the data processing portion 11 may generate the target object schematic image data by using the taken-image data acquired from the imaging portion 14 in addition to the detected data and the avionics data. Or, the data processing portion 11 may acquire data other than the detected data, the avionics data, and the taken-image data and use the data for the generation of the target object schematic image data.

In the present embodiment, the helicopter 30 is described as the aircraft including the support system 10A, 10B, or 10C according to the present disclosure. However, the aircraft is not limited to this and is only required to be able to hover. One example of the specific configuration of the helicopter 30 is schematically shown in FIG. 2. The specific configuration of the helicopter 30 is not limited to the configuration shown in FIG. 2, and the helicopter 30 may have any of various configurations including, for example, a drone or other aircraft having two, three, four or more rotating propellers which generate vertical thrust. The invention is also applicable to other environments, such as underwater environments in which a submarine may operate. A vehicle includes but is not limited to an aircraft, a helicopter, a drone, a submarine, or any other desired type of vehicle.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, portions or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

As above, to solve the above problems, an aircraft hovering work support system according to the present disclosure is mounted on an aircraft capable of hovering and includes: a detecting portion configured to detect a target object which is located outside an airframe of the aircraft and may become an obstacle during hovering of the aircraft; a data processing portion configured to process data acquired from at least one of the detecting portion and an avionics system of the aircraft; and a display portion. The data processing portion generates target object schematic image data by using detected data acquired from the detecting portion and avionics data acquired from the avionics system and outputs the target object schematic image data to the display portion, the target object schematic image data indicating approach of the target object to the aircraft or possibility of the approach of the target object to the aircraft. Based on the target object schematic image data, the display portion displays an obstacle state display image schematically showing a state of the obstacle around the aircraft.

According to the above configuration, the data processing portion generates the target object schematic image data by using the data acquired from the detecting portion and the avionics system, and the display portion displays, based on the target object schematic image data, the obstacle state display image containing a schematic image of the target object that may become an obstacle. Since the target object schematic image data is generated by using not only the detected data acquired from the detecting portion but also the avionics data of the aircraft, the target object schematic image data is the image data having more excellent accuracy. With this, the pilot can easily recognize the presence or absence of the obstacle around the aircraft or the state of the approach of the obstacle only by temporarily confirming the display portion during the hovering. Therefore, the pilot can properly recognize the existence of the obstacle during the hovering work of the aircraft capable of hovering.

The aircraft hovering work support system may be configured such that the data processing portion generates the target object schematic image data when the number of times of detection of the detected data of a same region or a same target is a preset determination threshold or more.

The aircraft hovering work support system may be configured such that: the detected data acquired from the detecting portion contains distance data indicating a distance to the target object; when the distance data falls within a preset distance range, the data processing portion sets the determination threshold in accordance with the distance to the target object; and when the distance data falls outside the distance range, the data processing portion ignores the detected data.

The aircraft hovering work support system may be configured such that: the avionics data contains movement speed data of the aircraft; and the data processing portion sets the determination threshold based on the movement speed data.

To solve the above problems, an aircraft hovering work support system according to the present disclosure is mounted on an aircraft capable of hovering and includes: a detecting portion configured to detect a target object which is located outside an airframe of the aircraft and may become an obstacle during hovering of the aircraft; a data processing portion configured to process data acquired from at least one of the detecting portion and an avionics system of the aircraft; and a display portion. The data processing portion generates state image data and plural-stage target object schematic image data from the acquired data and outputs the state image data and the plural-stage target object schematic image data to the display portion, the state image data indicating a state of surroundings of the airframe as a center, the plural-stage target object schematic image data indicating approach of the target object to the aircraft or possibility of the approach of the target object to the aircraft and corresponding to a distance to the target object. As an obstacle state display image showing a state of the obstacle around the aircraft, the display portion displays a circular image and a target object schematic image, the circular image being based on the state image data and corresponding to front, rear, left, and right directions of the airframe as a center, the target object schematic image being based on the target object schematic image data and located at a circumference portion of the circular image in a direction corresponding to a direction in which the target object exists. When the target object approaches the airframe, the target object schematic image is displayed so as to project from the circumference portion of the circular image toward a center portion of the circular image in accordance with stages of the target object schematic image data.

According to the above configuration, the data processing portion generates the state image data and the target object schematic image data from the data acquired from the detecting portion and the avionics system, and the display portion displays, based on the state image data and the target object schematic image data, the circular image and the plural-stage target object schematic image which show the state around the aircraft. Especially, the target object schematic image is displayed so as to project toward the airframe from a direction corresponding to a direction of the existence of the target object as the target object approaches. With this, the pilot can easily recognize the presence or absence of the obstacle around the aircraft or the state of the approach of the obstacle only by temporarily confirming the display portion during the hovering. Therefore, the pilot can properly recognize the existence of the obstacle during the hovering work of the aircraft capable of hovering.

The aircraft hovering work support system may be configured such that: the data processing portion generates instrument data image data containing at least one of a ground speed, a pressure altitude, an ascending/descending ratio, and a sideslip angle and outputs the instrument data image data to the display portion; and the display portion displays instrument data together with the circular image and the target object schematic image, the instrument data being based on the instrument data image data.

The aircraft hovering work support system may be configured such that the target object schematic image is displayed in different colors in accordance with the stages of the target object schematic image data.

The aircraft hovering work support system may further include an imaging portion provided outside the airframe of the aircraft and configured to take an image of surroundings of the aircraft.

The aircraft hovering work support system may be configured such that the display portion displays both a taken image and the obstacle state display image on a same screen image in parallel, the taken image being based on the taken-image data.

The aircraft hovering work support system may be configured such that the imaging portion is provided at least a rear portion of the airframe.

The aircraft hovering work support system may be configured such that the imaging portion is further provided at at least one of a lower portion of the airframe and a side portion of the airframe.

The aircraft hovering work support system may further include a plurality of imaging portions configured to take images in different directions around the aircraft and may be configured such that: among the plurality of imaging portions, one imaging portion configured to take an image of the target object is referred to as a specific imaging portion; and the display portion displays both the obstacle state display image and a taken image on the same screen image in parallel, the taken image being based on the taken-image data taken by the specific imaging portion.

The aircraft hovering work support system may be configured such that: the data processing portion generates the target object schematic image data and also generates annotation image data displayed so as to overlap the taken image, and outputs the target object schematic image data and the annotation image data to the display portion; and the display portion displays an annotation image such that the annotation image overlaps the taken image, the annotation image being based on the annotation image data.

The aircraft hovering work support system may be configured such that the detecting portion is a LIDAR.

The aircraft hovering work support system may be configured such that at least one of the detecting portion, the imaging portion, the display portion, and the data processing portion is configured as an independent apparatus attachable to the airframe of the aircraft.

The aircraft hovering work support system may be configured such that the display portion is at least one of a mobile terminal including a display screen image and a head mount display.

An aircraft capable of hovering according to the present disclosure includes any one of the above aircraft hovering work support systems.

According to the aircraft capable of hovering, the aircraft may be a helicopter.

The aircraft capable of hovering may be configured such that: the avionics system of the aircraft includes a navigation system; and the data processing portion acquires navigation data from the navigation system and uses the navigation data for at least the generation of the target object schematic image data.

The aircraft capable of hovering may further include an informing apparatus configured to inform a pilot of a warning and may be configured such that: the data processing portion generates warning data from the acquired data and outputs the warning data to the informing apparatus, the warning data indicating a warning of the approach of the target object to the aircraft; and the informing apparatus performs an informing operation based on the warning data.

The present disclosure is not limited to the above described embodiments and may be modified in various ways within the scope of the claims, and embodiments obtained by suitably combining technical means disclosed in different embodiments and/or plural modified examples are included in the technical scope of the present disclosure.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

INDUSTRIAL APPLICABILITY

The present invention is widely and suitably utilized in the field of supporting a pilot during hovering work of an aircraft, such as a helicopter, capable of hovering.

REFERENCE SIGNS LIST 10A to 10C aircraft hovering work support system
11 data processing portion
12 detecting portion
13 display portion
13A pad-type mobile terminal (display portion)
13B head mount display (display portion)
14 imaging portion
14A rear-side imaging portion
14B lower-side imaging portion
14C lateral-side imaging portion
21 avionics system
22 inertial navigation system (INS)
23 global positioning system (GPS)
24 informing apparatus
30 helicopter (aircraft)
31 airframe
40 circular image
40a caution annular region
40b warning annular region
41 airframe schematic image
42 target object schematic image
42a first-stage image (target object schematic image)
42b second-stage image (target object schematic image)
42c third-stage image (target object schematic image)
50, 51 obstacle display screen image
52 imaging portion display screen image
52a rear-side taken image
52b lateral-side taken image
53 mobile terminal display screen image
54a first-stage marking image (annotation image)
54b second-stage marking image (annotation image)

The invention claimed is:

1. A system for use with a vehicle, comprising:
a detector configured to detect a target object which is located outside of the vehicle;
a display; and
circuitry configured to:
generate state image data and plural-stage target object image data from acquired data from the detector and output the state image data and the plural-stage target object image data to the display, the state image data indicating a state of surroundings of the vehicle at a center, the plural-stage target object image data indicating approach of the target object to the vehicle or possibility of the approach of the target object to the vehicle and corresponding to a distance to the target object;
display on the display as an obstacle state display image showing a state of the obstacle around the vehicle, the display displaying a circular image and target object images, the circular image being based on the state image data and corresponding to front, rear, left, and right directions of the vehicle as the center, the target object images being based on the plural-stage target object image data and located at a circumference portion of the circular image in a direction corresponding to a direction at which the target object exists; and
display on the display, when the target object approaches an airframe of the vehicle, the target object images so as to project from the circumference portion of the circular image toward a center portion of the circular image in accordance with stages of the target object image data,
the circular image including:
a caution annular region located at an outermost portion of the circumference of the circular image and showing differences of a degree of caution by the types of the target object images; and a warning annular region located inside the caution annular region and showing differences of a degree of warning by height of the target object images in a direction toward the center portion.

2. The system according to claim 1, wherein:

the circuitry generates instrument data image data containing at least one of a ground speed, a pressure altitude, an ascending/descending ratio, and a sideslip angle and outputs the instrument data image data to the display; and the display displays the instrument data image together with the circular image and the target object images.

3. The system according to claim 1, wherein a target object image of the target object images is displayed in different colors in accordance with the stages of the target object image data.

4. The system according to claim 1, wherein the caution annular region includes one ring.

5. The system according to claim 1, wherein the warning annular region includes five rings.

6. The system according to claim 5, wherein the five rings are referred to as a first ring, a second ring, a third ring, a fourth ring, and a fifth ring in this order from an outside, and the degree of warning increases in order from the first ring to the fifth ring.

7. The system according to claim 1, wherein the circular image includes concentric circles.

* * * * *